United States Patent
Yamada et al.

(10) Patent No.: US 8,526,736 B2
(45) Date of Patent: Sep. 3, 2013

(54) IMAGE PROCESSING APPARATUS FOR CORRECTING LUMINANCE AND METHOD THEREOF

(75) Inventors: Kiriko Yamada, Yokohama (JP); Shunichi Shichijo, Yokosuka (JP)

(73) Assignee: JVC Kenwood Corporation (JP)

( * ) Notice: Subject to any disclaimer, the term of this patent is extended or adjusted under 35 U.S.C. 154(b) by 85 days.

(21) Appl. No.: 13/281,712

(22) Filed: Oct. 26, 2011

(65) Prior Publication Data
US 2012/0106867 A1   May 3, 2012

(30) Foreign Application Priority Data

Oct. 29, 2010  (JP) ................................. 2010-242941
Feb. 21, 2011  (JP) ................................. 2011-034115

(51) Int. Cl.
   *G06K 9/34*   (2006.01)
(52) U.S. Cl.
   USPC ......................................................... 382/174
(58) Field of Classification Search
   None
   See application file for complete search history.

(56) References Cited

U.S. PATENT DOCUMENTS

2008/0278632 A1* 11/2008 Morimoto ..................... 348/687
2008/0298723 A1* 12/2008 Hasegawa ..................... 382/305

FOREIGN PATENT DOCUMENTS

| JP | 2005-039458 | 2/2005 |
| JP | 2008-072450 | 3/2008 |
| JP | 2009-296210 | 12/2009 |

* cited by examiner

*Primary Examiner* — Nirav G Patel
(74) *Attorney, Agent, or Firm* — Cantor Colburn LLP

(57) ABSTRACT

An image processing apparatus capable of performing good luminance correction without performing a cumbersome process is provided. The image processing apparatus includes an illumination light component estimation unit which calculates an estimated illumination light component of an original image, an estimated illumination light component correction unit which outputs a corrected estimated illumination light component obtained by correcting the estimated illumination light component, and a Retinex processing unit which corrects a luminance component of the original image by dividing the luminance component by the corrected estimated illumination light component.

11 Claims, 25 Drawing Sheets

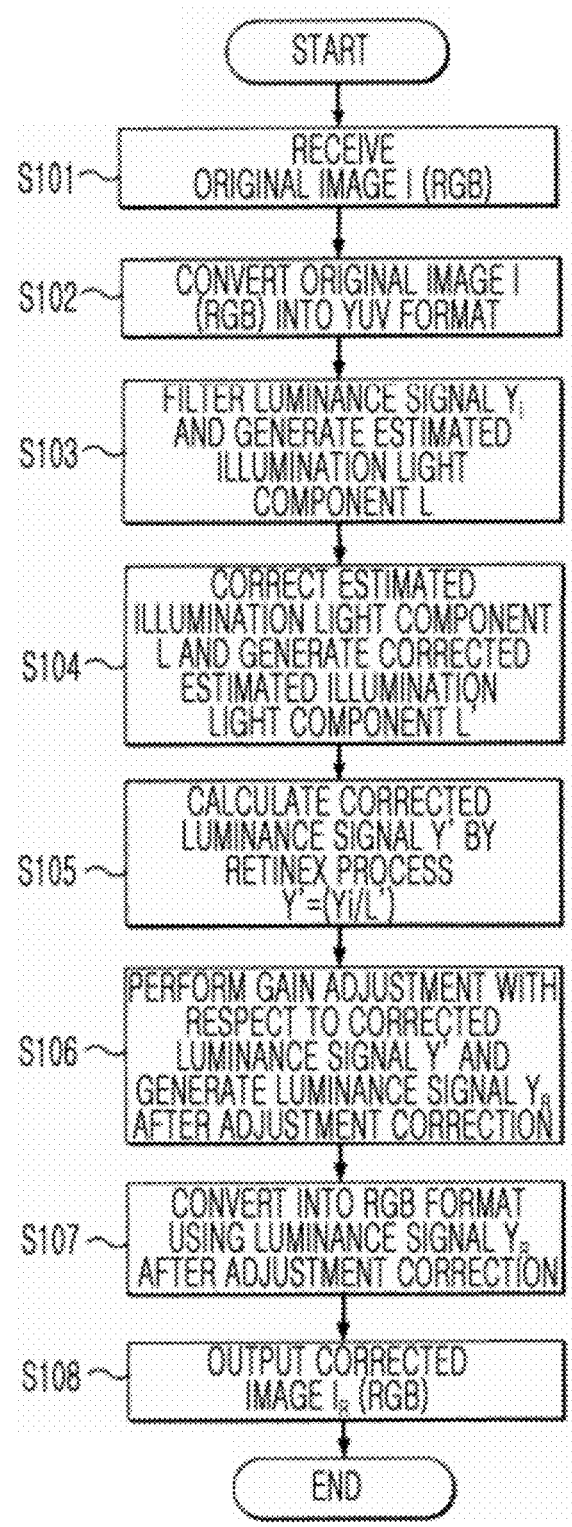

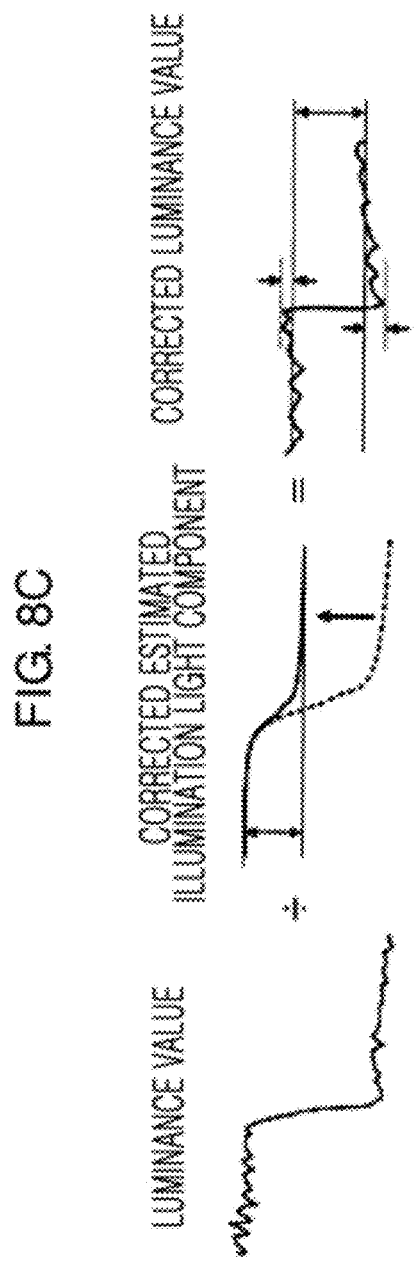

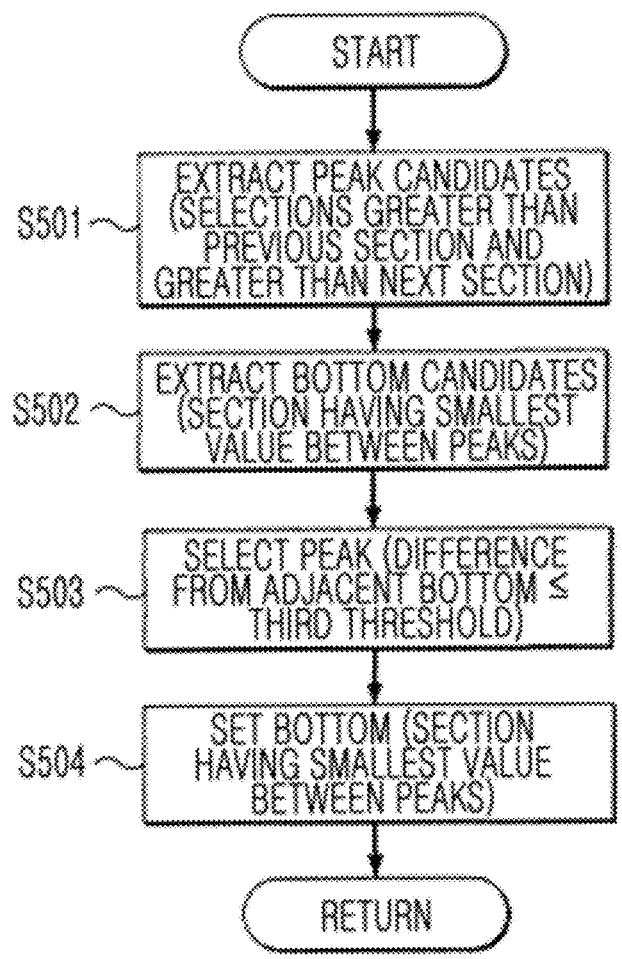

IMAGE PROCESSING APPARATUS FOR CORRECTING LUMINANCE AND METHOD THEREOF

CROSS-REFERENCE TO RELATED PATENT APPLICATIONS

This application claims the benefit of Japanese Patent Application No. 2010-242941, filed on Oct. 29, 2010 and Japanese Patent Application No. 2011-034115, filed on Feb. 21, 2011, in the Japan Patent Office, the disclosures of which are incorporated herein in their entireties by reference.

BACKGROUND OF THE INVENTION

1. Field of the Invention

The present invention relates to an image processing apparatus and, more particularly, to an image processing apparatus and an image processing method capable of performing good luminance correction without performing a cumbersome process. Also, the present invention relates to an image processing apparatus and an image processing method capable of performing good luminance correction without losing gradation of a high-luminance part.

2. Description of the Related Art

When a subject is captured under a biased illumination condition such as backlight, a large brightness difference may be generated according to exposure conditions of illumination and a bad image may be generated. Such an image is corrected by performing an image processing, thereby improving image quality.

As an image processing method, a Retinex process of extracting an illumination light component from an original image and correcting a luminance component of the original image by using the illumination light component has been known. The Retinex process is based on the Retinex theory wherein a human vision includes contrast constancy or color constancy, which is to see an external world at a state where illumination light is eliminated.

According to the Retinex theory, a human vision perceives a color according to a ratio of reflectance components of each object. The reflectance component is an image component of a subject, which does not depend on illumination. In contrast, in an original image captured by a video equipment, the value of each pixel is determined by the physical amount of received light and is expressed by a product of a reflectance component and an illumination light component. Accordingly, the reflectance component is obtained by separating the illumination light component from the original image, thereby obtaining an appropriate image which does not depend on the illumination light component.

As the Retinex process, various methods such as Single-Scale-Retinex (SSR), Multi-Scale-Retinex (MSR) or Linear Retinex (LR) are proposed. Here, for example, the LR method shown in Equation 1 will be briefly described. The LR method shown in Equation 1 performs correction of each component.

$$R_i(x, y) = A * \left( \frac{I_i(x, y)}{Y(x, y) \otimes F(x, y)} \right) \quad \text{[Equation 1]}$$

In Equation 1, Ii(x, y) denotes a pixel value of a pixel (x, y) of an original image, Y(x, y) denotes a luminance component of the pixel (x, y) of the original image, and Ri(x, y) denotes a result of correcting the pixel value Ii(x,y) of the original image. i denotes each component of the original image I and becomes R, G and B if the original image I is represented by an RGB component. A denominator of a right side corresponds to an illumination light component and an image having a blurred luminance component is used as an estimated illumination light component. F denotes a filter function for planarizing the pixel (x, y) using peripheral pixels and may include a Gaussian filter or the like.

In Equation 1, since the luminance component of the pixel (x, y) of the original image is divided by the estimated illumination light component obtained by blurring the luminance component, the division result is distributed around 1. A of the right side is a gain correction value for associating this distribution with a luminance signal range, for example, 0 to 255. In the gain correction value, according to the need, an offset correction value is used or clipping is performed.

For example, it may be assumed the case where the luminance component of any original image has a distribution shown in FIG. 19(a). In this figure, a horizontal axis denotes a luminance value and a vertical axis denotes the number of pixels. Pixels are concentrated on a dark part with a low luminance value and a bright part with a high luminance value, thereby obtaining an image with a large luminance difference.

FIG. 19(b) shows a distribution of an estimated illumination light component obtained by blurring a luminance component of an original image and FIG. 19(c) shows a luminance distribution after dividing a luminance component of an original image by an estimated illumination light component.

In FIG. 19(c), values are concentrated on 1. The pixels are regarded as pixels in which the luminance component value of the original image is substantially equal to the estimated illumination light component value of the blurred image. In other words, the pixels are pixels of a low spatial frequency region with uniform brightness barely changed from those of peripheral pixels.

A pixel having a value close to 0 has low luminance and a peripheral pixel thereof has high luminance. A pixel having a large value has high luminance and a peripheral pixel thereof has low luminance. The peripheral pixel is corrected darkly in the former case and is corrected bright in the latter case.

As described above, in order to associate the luminance distribution after dividing the luminance component of the original image by the estimated illumination light component shown in FIG. 19(c) with the luminance signal range, for example 0 to 255, gain correction is performed. A lot of clipped highlights may occur or dark-part noise may be emphasized, according to gain settings, thereby influencing image quality. Thus, gain need to be appropriately set. However, since a luminance distribution shape or range differs according to images, it is difficult to set gain suitable for an image. Thus, processing is cumbersome.

In the low spatial frequency region with uniform brightness, since a value after dividing the luminance component by the estimated illumination light component becomes close to 1, regardless of the luminance of the original image, a bright region tends to become dark and a dark region tends to become bright. Accordingly, in a region in which a color change is low, such as sky, a phenomenon in which contrast of a low frequency region is deteriorated occurs.

Further, in a region in which a difference in luminance from a peripheral pixel is large, such as an edge part, since an estimated illumination light component is obtained by smoothing a luminance signal, a halo phenomenon in which a boundary part of a bright side is corrected to extremely high luminance and a boundary part of a dark side is corrected to extremely low luminance occurs. In particular, in a backlight image or the like, a halo phenomenon of a high luminance side in which a bright part of a boundary part between a main subject such as a person and a background becomes extremely bright is problematic. A method of suppressing a halo phenomenon by applying an edge preserving filter when calculating the estimated illumination light component has been proposed. However, in the edge preserving filter, the amount of calculation is large and thus processing becomes cumbersome.

Further, when an image is corrected bright, clipped highlights may occur in an originally bright part or gradation of a bright part may be lost. In order to prevent this phenomenon, for example, in Patent Document 3, a pixel in which an average luminance value of the pixel and peripheral pixels of the pixel is equal to or less than a threshold value is corrected bright by multiplying correction gain, and a high-luminance pixel in which an average luminance value of the pixel and peripheral pixels of the pixel is greater than the threshold value is not corrected by setting correction gain to 1 so as to maintain the gradation of the high-luminance part.

However, the detailed method of setting the threshold value is not disclosed in Patent Document 3. Patent Document 3 discloses that the threshold value is statistically or experimentally obtained and discloses only a special image clearly showing a luminance distribution. In practice, however, since the luminance distribution shape or range differs according to images, it is difficult to set a threshold suitable for an individual image.

[Patent Document 1] Japanese Patent Laid-Open Publication No. 2005-039458
[Patent Document 2] Japanese Patent Laid-Open Publication No. 2008-072450
[Patent Document 3] Japanese Patent Laid-Open Publication No. 2009-296210

SUMMARY OF THE INVENTION

Accordingly, the present invention provides an image processing apparatus and an image processing method capable of performing good luminance correction without performing a cumbersome process. In addition, the present invention provides an image processing apparatus and an image processing method capable of quantitatively performing good luminance correction suitable for an individual image and, more particularly, performing good luminance correction without losing gradation of a high-luminance part.

According to a first embodiment of the present invention, there is provided an image processing apparatus including an illumination light component estimation unit which calculates an estimated illumination light component of an original image, an estimated illumination light component correction unit which outputs a corrected estimated illumination light component obtained by correcting the estimated illumination light component, a Retinex processing unit which corrects a luminance component of the original image by dividing the luminance component by the corrected estimated illumination light component, and a gain adjustment unit which adjusts gain of the corrected luminance component, wherein the estimated illumination light component correction unit converts an estimated illumination light component having a value from 0 to a reference value into a maximum value of the corrected estimated illumination light component, converts an estimated illumination light component having a value greater than the reference value such that the value of the corrected estimated illumination light component becomes greater than the value of the estimated illumination light component, and uses a property in which an increasing ratio of the corrected estimated illumination light component is decreased as the value of the estimated illumination light component is increased.

The gain adjustment unit may perform gain adjustment by multiplying the corrected luminance component by a uniform gain value regardless of content of the original image.

The estimated illumination light component correction unit may convert the estimated illumination light component having the value greater than the reference value into the corrected estimated illumination light component having a value greater than a property represented by 0.3 power of the value of the estimated illumination light component.

According to a second embodiment of the present invention, there is provided an image processing method including an illumination light component estimation step of calculating an estimated illumination light component of an original image, an estimated illumination light component correction step of outputting a corrected estimated illumination light component obtained by correcting the estimated illumination light component, a Retinex processing step of correcting a luminance component of the original image by dividing the luminance component by the corrected estimated illumination light component, and a gain adjustment step of adjusting gain of the corrected luminance component, wherein the estimated illumination light component correction step converts an estimated illumination light component having a value from 0 to a reference value into a maximum value of the corrected estimated illumination light component, converts an estimated illumination light component having a value greater than the reference value such that the value of the corrected estimated illumination light component becomes greater than the value of the estimated illumination light component, and uses a property in which an increasing ratio of the corrected estimated illumination light component is decreased as the value of the estimated illumination light component is increased.

According to a third embodiment of the present invention, there is provided an image processing apparatus including an illumination light component estimation unit which calculates an estimated illumination light component of an original image, an estimated illumination light component correction unit which outputs a corrected estimated illumination light component obtained by correcting the estimated illumination light component, and a Retinex processing unit which corrects a luminance component of the original image by dividing the luminance component by the corrected estimated illumination light component, wherein the estimated illumination light component correction unit obtains a lowest-luminance side section having a frequency value equal to or greater than a second threshold in sections equal to or greater than a first threshold of a frequency distribution, in which a value from a lowest-luminance side to a highest-luminance side of the estimated illumination light component is divided into a plurality of sections, and corrects the estimated illumination light component value equal to or greater than a minimum luminance value of the obtained section to a maximum value of the corrected estimated illumination light component.

According to a fourth embodiment of the present invention, there is provided an image processing apparatus including an illumination light component estimation unit which calculates an estimated illumination light component of an original image, an estimated illumination light component correction unit which outputs a corrected estimated illumination light component obtained by correcting the estimated illumination light component, and a Retinex processing unit which corrects a luminance component of the original image by dividing the luminance component by the corrected estimated illumination light component, wherein the estimated illumination light component correction unit obtains a lowest-luminance side section having a frequency value equal to or greater than a second threshold in sections equal to or greater than a first threshold of an accumulative frequency distribution from a high-luminance side, in which a value from a lowest-luminance side to a highest-luminance side of the estimated illumination light component is divided into a plurality of sections, and corrects the estimated illumination light component value equal to or greater than a minimum luminance value of the obtained section to a maximum value of the corrected estimated illumination light component.

Even in any embodiment, the second threshold may be a frequency value obtained by a corresponding section in case of a uniform luminance distribution.

According to a fifth embodiment of the present invention, there is provided an image processing apparatus including an illumination light component estimation unit which calculates an estimated illumination light component of an original image, an estimated illumination light component correction unit which outputs a corrected estimated illumination light component obtained by correcting the estimated illumination light component, and a Retinex processing unit which corrects a luminance component of the original image by dividing the luminance component of the original image by the corrected estimated illumination light component, wherein the estimated illumination light component correction unit extracts a peak section of a highest-luminance side and a bottom section of the highest-luminance side in the frequency distribution, in which a value from a lowest-luminance side to a highest-luminance side of the estimated illumination light component is divided into a plurality of sections, and corrects the estimated illumination light component value equal to or greater than a minimum luminance value of the bottom section to a maximum value of the corrected estimated illumination light component if the frequency value of the extracted peak section is equal to or greater than a first threshold and a sum of frequency values from the highest-luminance section to the extracted bottom section is equal to or greater than a second threshold.

According to a sixth embodiment of the present invention, there is provided an image processing method including an illumination light component estimation step of calculating an estimated illumination light component of an original image, an estimated illumination light component correction step of outputting a corrected estimated illumination light component obtained by correcting the estimated illumination light component, and a Retinex processing step of correcting a luminance component of the original image by dividing the luminance component by the corrected estimated illumination light component, wherein the estimated illumination light component correction step obtains a lowest-luminance side section having a frequency value equal to or greater than a second threshold in sections equal to or greater than a first threshold of a frequency distribution, in which a value from a lowest-luminance side to a highest-luminance side of the estimated illumination light component is divided into a plurality of sections, and corrects the estimated illumination light component value equal to or greater than a minimum luminance value of the obtained section to a maximum value of the corrected estimated illumination light component.

According to a seventh embodiment of the present invention, there is provided an image processing method including an illumination light component estimation step of calculating an estimated illumination light component of an original image, an estimated illumination light component correction step of outputting a corrected estimated illumination light component obtained by correcting the estimated illumination light component, and a Retinex processing step of correcting a luminance component of the original image by dividing the luminance component by the corrected estimated illumination light component, wherein the estimated illumination light component correction step obtains a lowest-luminance side section having a frequency value equal to or greater than a second threshold in sections equal to or greater than a first threshold of an accumulative frequency distribution from a high-luminance side, in which a value from a lowest-luminance side to a highest-luminance side of the estimated illumination light component is divided into a plurality of sections, and corrects the estimated illumination light component value equal to or greater than a minimum luminance value of the obtained section, to a maximum value of the corrected estimated illumination light component.

According to an eighth embodiment of the present invention, there is provided an image processing method including an illumination light component estimation step of calculating an estimated illumination light component of an original image, an estimated illumination light component correction step of outputting a corrected estimated illumination light component obtained by correcting the estimated illumination light component, and a Retinex processing step of correcting a luminance component of the original image by dividing the luminance component of the original image by the corrected estimated illumination light component, wherein the estimated illumination light component correction step extracts a peak section of a highest-luminance side and a bottom section of the highest-luminance side in the frequency distribution, in which a value from a lowest-luminance side to a highest-luminance side of the estimated illumination light component is divided into a plurality of sections, and corrects the estimated illumination light component value equal to or greater than a minimum luminance value of the bottom section to a maximum value of the corrected estimated illumination light component if the frequency value of the extracted peak section is equal to or greater than a first threshold and a sum of frequency values from the highest-luminance section to the extracted bottom section is equal to or greater than a second threshold.

BRIEF DESCRIPTION OF THE DRAWINGS

FIG. 2 is a flowchart illustrating an image correction procedure according to the present embodiment.

FIG. 17 is a flowchart illustrating an example of a procedure of detecting a peak and a bottom of a histogram ratio Hp[0:15].

DETAILED DESCRIPTION OF THE INVENTION

Figure 1:
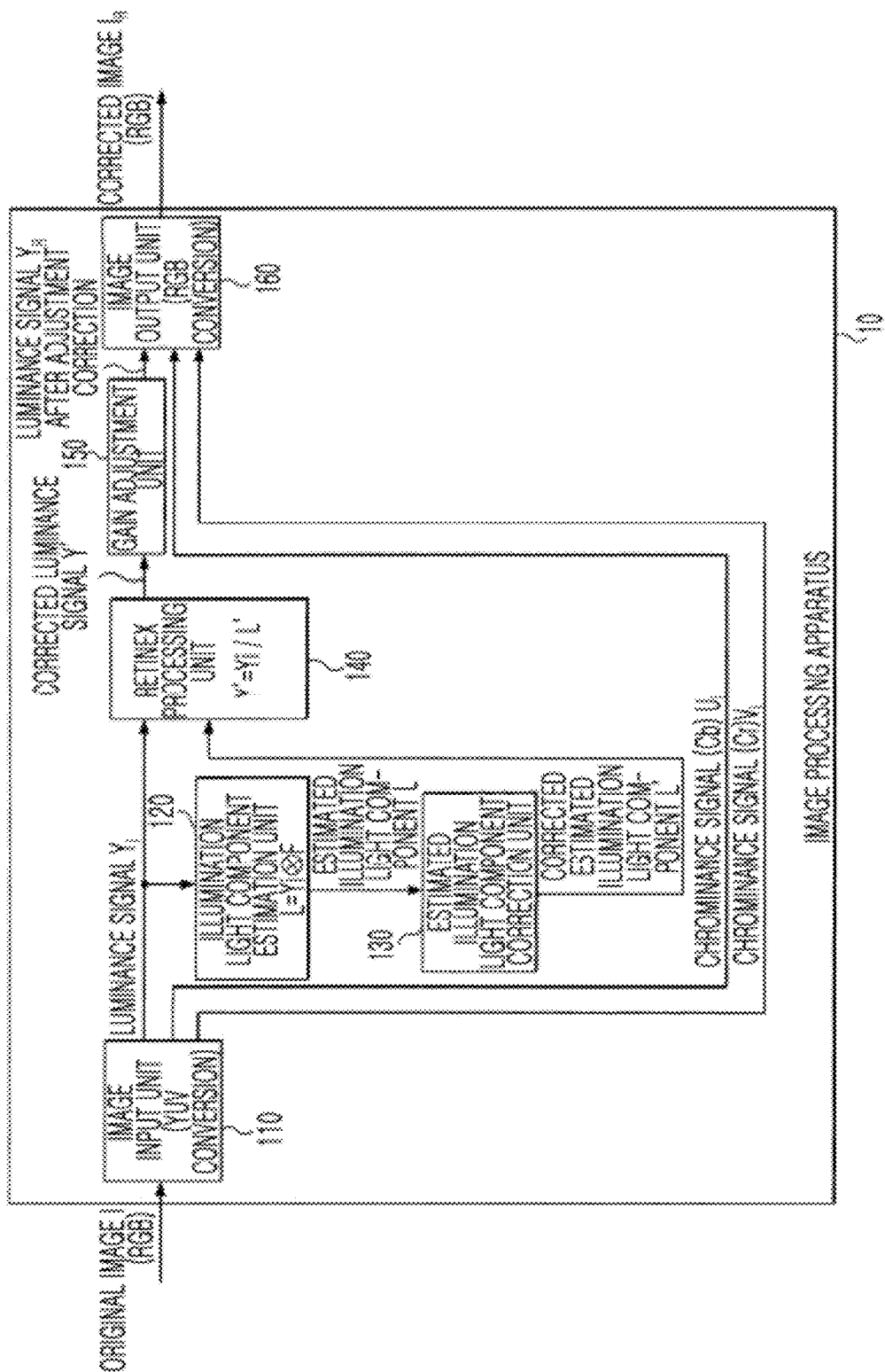
FIG. 1 is a block diagram showing the configuration of an image processing apparatus according to the present embodiment.

Embodiments of the present invention will be described in detail with reference to the drawings. FIG. 1 is a block diagram showing the configuration of an image processing apparatus according to the present embodiment. In the present embodiment, the image processing apparatus 10 receives an original image I and outputs a corrected image $I_R$ obtained by performing luminance correction by a Retinex process.

As shown in this figure, the image processing apparatus 10 includes an image input unit 110, an illumination light component estimation unit 120, an estimated illumination light component correction unit 130, a Retinex processing unit 140, a gain adjustment unit 150, and an image output unit 160.

The image input unit 110 receives the original image I. The original image I may be, for example, an image captured by an imaging apparatus and may be any one of images constituting a still image or a moving image. At this time, if the original image I is an RGB image, YUV conversion is performed. Here, a YUV format refers to a format representing an image signal by a luminance signal Y, a chrominance signal (Cb) U and a chrominance signal (Cr) V. The original image I converted into the YUV format is represented by a luminance signal $Y_i$, a chrominance signal (Cb) $U_i$, and a chrominance signal (Cr) $V_i$. If the original image I is in an image format in which a luminance component is separated, a conversion process into the YUV format is unnecessary.

The illumination light component estimation unit 120 performs planarization by performing a filtering process with respect to the luminance signal $Y_i$ of the original image I, and calculates an estimated illumination light component L. A function used for filtering may be, for example, a Gaussian function. In the Gaussian function, a scale for setting the amount of referred peripheral pixels is set, but a single scale or a plurality of scales may be used. In case of using a plurality of scales, the size of each scale may differ and may be weighted.

The estimated illumination light component correction unit 130 performs correction with respect to the estimated illumination light component L and generates a corrected estimated illumination light component L'. Correction of the estimated illumination light component L is one of features of the present embodiment. Correction of the estimated illumination light component L performed by the estimated illumination light component correction unit 130 will be described in detail below.

The Retinex processing unit 140 corrects by dividing the luminance signal $Y_i$ of the original image I by the corrected estimated illumination light component L' and generates a corrected luminance signal Y'. Hereinafter, a process of dividing the luminance signal $Y_i$ of the original image I by the estimated illumination light component L or the corrected estimated illumination light component L' is referred to as a Retinex process.

The gain adjustment unit 150 performs gain correction for associating the corrected luminance signal Y' distributed around 1 with a luminance signal range and generates a luminance signal $Y_R$ after adjustment correction. As will be described below, in the present embodiment, since the corrected luminance signal Y' is distributed in a region substantially equal to or less than 1, a gain value may be uniformly set without depending on content of an image. Accordingly, a cumbersome process of setting a gain suitable for each image may be omitted. The gain value may be set to 255 if a luminance signal range is 0 to 255. In this case, setting of an offset value is not mandatory.

The image output unit 160 outputs the corrected image $I_R$ in which the luminance signal $Y_i$ of the original image I is corrected to the luminance signal $Y_R$ after adjustment correction. If the corrected image $I_R$ is output in an RGB format, conversion from a YUV format into an RGB format is performed. Conversion into the RGB format is performed using the luminance signal $Y_R$ after adjustment correction, the chrominance signal (Cb) $U_i$ and the chrominance signal (Cr) $V_i$.

Next, an image correction procedure of the image processing apparatus 10 of the present embodiment will be described with reference to the flowchart of FIG. 2.

First, the image input unit 110 receives the original image I of the RGB format (step S101). The image input unit 110 converts the original image I of the RGB format into the YUV format (Step S102). The original image I after converted into the YUV format may be represented by the luminance signal $Y_i$, the chrominance signal (Cb) $U_i$ and the chrominance signal (Cr) $V_i$.

The illumination light component estimation unit 120 generates the estimated illumination light component L by filtering the luminance signal $Y_i$ (step S103). Although filtering is performed by using the Gaussian function using a plurality of scales, other smoothing filters such as a low pass filter may be used. An illumination light component may be estimated by using other methods. For example, instead of the luminance signal, a G signal of an RGB format may be used.

The estimated illumination light component correction unit 130 corrects the estimated illumination light component L so as to generate the corrected estimated illumination light component L' (step S104). The details of the present process will be described below.

Subsequently, the Retinex processing unit 140 performs correction by dividing the luminance signal $Y_i$ of the original image I by the corrected estimated illumination light component L', and generates the corrected luminance signal Y' (step S105). The gain adjustment unit 150 performs gain adjustment with respect to the corrected luminance signal Y' such that a gain value thereof is uniformly set to 255, for example and generates the luminance signal $Y_R$ after adjustment correction (step S106).

$$Y_R(x, y) = A * \left( \frac{Y_i(x, y)}{Y_i(x, y) \otimes F(x, y)} \right)$$ [Equation 2]

In Equation 2, $Y_i(x, y)$ denotes a luminance component of a pixel (x, y) of the original image and $Y_R(x, y)$ denotes a luminance component of the pixel (x, y) after correction. In the present embodiment, instead of the LR method shown in Equation 1, an LR method of correcting only the luminance component expressed by Equation 2 is used.

The image output unit 160 performs conversion into the RGB format by using the luminance signal $Y_R$ after adjustment correction, the chrominance signal (Cb) $U_i$ and chrominance signal (Cr) $V_i$ of the original image (step S107) and outputs the corrected image $I_R$ (step S108).

Next, correction of the estimated illumination light component L of the present invention will be described. Correction is performed by the estimated illumination light component correction unit 130 in step S104 and the corrected estimated illumination light component L' is generated as the correction result.

A main object of correction is to converge the distribution of the corrected luminance signal Y' into a region equal to or less than 1 while maintaining tendency before correction. Thus, a uniform gain value may be used and thus an optimal gain value for each image need not be set. Since the corrected luminance signal Y' is obtained by dividing the luminance signal $Y_i$ of the original image I by the estimated illumination light component L, the value of the estimated illumination light component L is preferably corrected to be increased in order to converge the distribution of the corrected luminance signal Y' into a range equal to or less than 1.

Figure 3A:
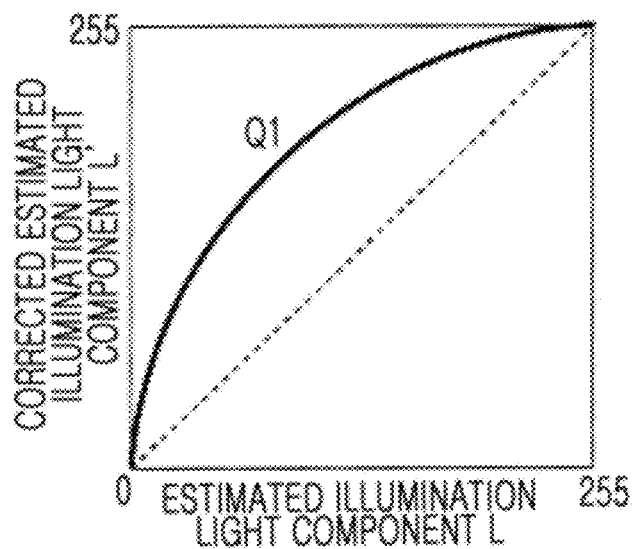
FIG. 3 is a diagram illustrating a correction example of an estimated illumination light component.
Figure 3B:
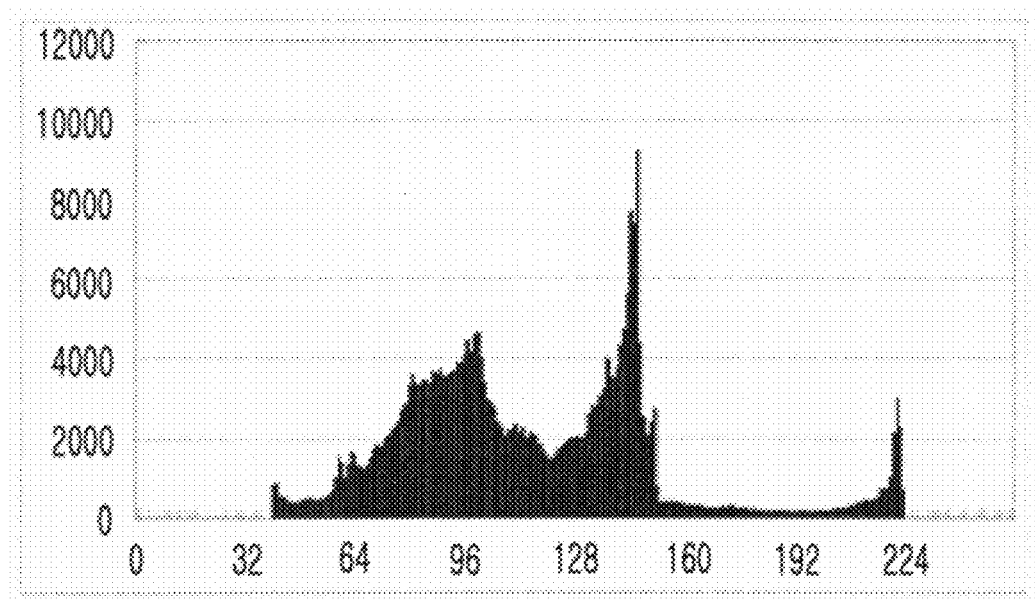
Figure 3C:
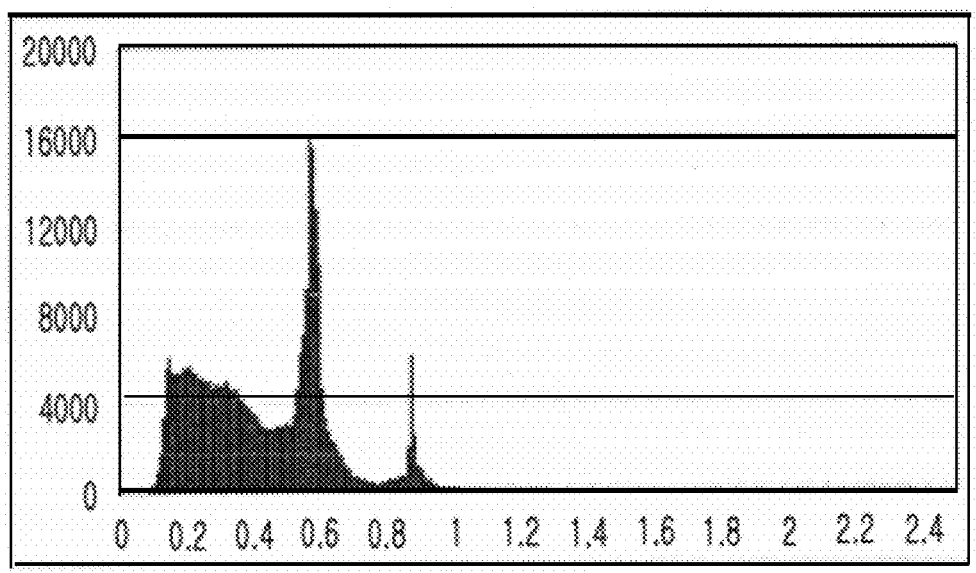
Figure 19A:
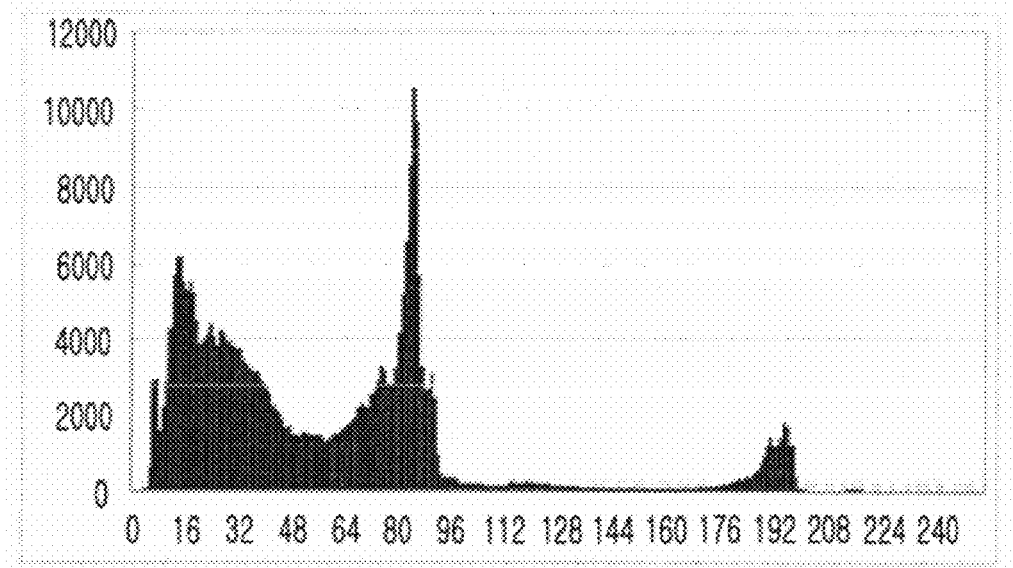
FIG. 19 is a diagram showing a conventional luminance distribution, an estimated illumination light component distribution and a luminance distribution of a division result.

As described in FIG. 5 of Patent Document 2, the estimated illumination light component L obtained from average luminance may be corrected to be in a property shown in a curve Q1 of FIG. 3(*a*). As a result, the distribution of the estimated illumination light component L shown in FIG. 19(*b*) is corrected to a distribution shape in which the estimated illumination light component L is entirely compressed in a high-luminance direction such that the luminance of a low-luminance part is increased as shown in FIG. 3(*b*).

If the luminance signal $Y_i$ of the original image I is divided by the corrected estimated illumination light component L', the corrected luminance signal Y' having the distribution shape shown in FIG. 3(*c*) can be obtained. The corrected luminance signal Y' is substantially converged into the range equal to or less than 1. Thus, the gain value can be uniformly set and thus the optimal gain value for each image need not be set.

However, if the estimated illumination light component L is corrected to be in the property shown in the curve Q1 of FIG. 3(*a*), dark-part noise of the corrected image $I_R$ is emphasized and a phenomenon in which a black part with lowest luminance is corrected bright, which is called black floating, may occur. Overcorrection may occur in a high-luminance part so as to lose gradation of high-luminance part. Accordingly, a good corrected image may be not necessarily obtained.

Now, influence of correction of the estimated illumination light component L on the corrected image will be described with reference to FIG. 6 and the reason why these problems occur will be described.

Figure 6:
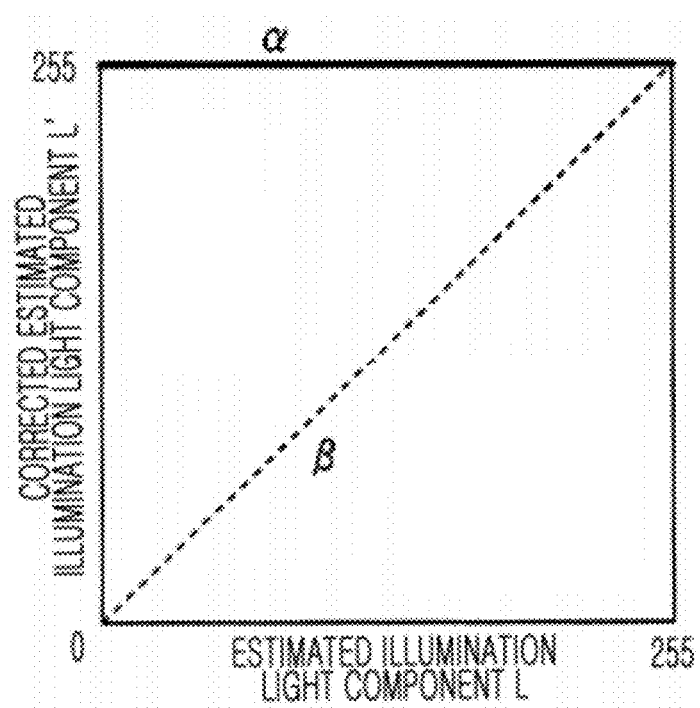
FIG. 6 is a diagram schematically illustrating influence of correction of an estimated illumination light component on a corrected image.

In the correction property shown in FIG. 6, a straight line β has the same meaning as the case where the estimated illumination light component L is not corrected, because values before and after correction are identical. That is, the same effect as the conventional Retinex process of dividing the luminance signal $Y_i$ of the original image I by the estimated illumination light component L can be obtained. More specifically, a dark part is corrected bright and a bright part is corrected darkly.

Meanwhile, in the correction property shown in FIG. 6, a straight line α uniformly replace the value of the estimated illumination light component L with a maximum value. If the luminance signal $Y_i$ of the original image I is uniformly divided by the maximum value, the luminance signal $Y_i$ of the original image I is normalized in a range of 0 to 1 while maintaining the original distribution shape. That is, the same effect as the case where image correction is not performed by the Retinex process is obtained. That is, as the slope of a line representing a property is increased, the Retinex effect for correcting a dark part bright and correcting a bright part darkly is increased. That is, the gradation of the original image I is not changed over the entire luminance range.

Accordingly, in the correction property represented by the curve Q1 of FIG. 3(*a*), the original image is barely corrected in a high-luminance part with a low slope and is corrected bright by the Retinex effect in a low-luminance part with a high slope. In general, since a dark part includes dark-part noise, if the dark part is corrected bright by the Retinex effect, dark-part noise is also emphasized. In addition, even in a black part with lowest luminance, luminance is corrected to be high, and black floating occurs.

In the first embodiment, the estimated illumination light component L is corrected using a property represented by P1 of FIG. 4(*a*). As shown in this figure, the property P1 has a shape in which a low-luminance part from luminance 0 to X of the estimated illumination light component L is converted into a maximum value of the scale of the estimated illumination light component L, more than luminance X+1 is converted such that the value of the corrected estimated illumination light component L' is greater than that of the estimated illumination light component L and the increasing ratio of the corrected estimated illumination light component L' is decreased as the luminance of the estimated illumination light component L is increased.

By this correction, since the low-luminance part from luminance 0 to X of the estimated illumination light component L is equal to the straight line α, the Retinex process of correcting a dark part bright is not performed. Accordingly, dark-part noise is not emphasized in the corrected image $I_R$ and black floating can be prevented from occurring.

By correcting the luminance 0 of the estimated illumination light component L to a maximum value, a conventional special process of considering zero division when dividing the luminance signal $Y_i$ of the original image I by the estimated illumination light component L can be omitted.

By this correction, since a sufficient Retinex effect is obtained from a dark part with luminance X+1 or more of the estimated illumination light component L to a bright part, it is possible to obtain the corrected image $I_R$ with improved contrast. As luminance is increased, the Retinex effect is decreased. Thus, it is possible to prevent contrast of a low frequency region from deteriorating by correcting a bright part darkly more than necessary.

In the case where the full scale of the estimated illumination light L is 255, it is experimentally found that the value of X is preferably set to 2 to 4 for most photographing scenes. Further, in the case where the input image I is an image received from an imaging apparatus, the value of X is preferably set according to dark-part noise characteristics of an imaging element used in the imaging apparatus. For example, in the case where dark-part noise is widely generated, the value of X may be set to be large. A method of interlocking with an Auto Gain Control (AGC) function of the imaging apparatus by changing the value of X may be efficiently used.

In the property P1, the curve is drawn in the part with a luminance value of X+1 or more such that the slope is increased in a part in which the value of the estimated illumination light component L is low, thereby increasing the Retinex effect. In addition, the slope is decreased in a part in which the value of the estimated illumination light component L is high, thereby decreasing the Retinex effect. It is experimentally found that the output value of this curve is set to be higher than that of a curve (a curve y of FIG. 4(a)) shown in Equation 3 such that a dark part is corrected bright and a bright part is barely corrected without depending on an input image, thereby improving contrast.

$$L'=L^{0.3} \quad \text{[Equation 3]}$$

Figure 4A:
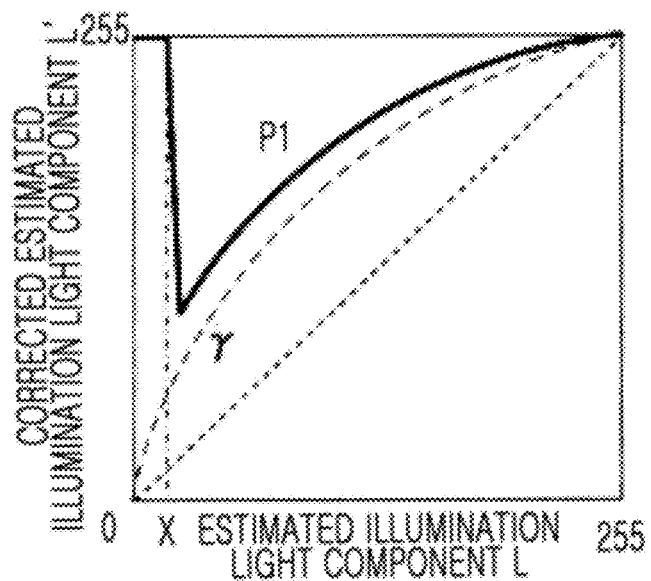
FIG. 4 is a diagram illustrating correction of an estimated illumination light component according to the present embodiment.
Figure 4B:
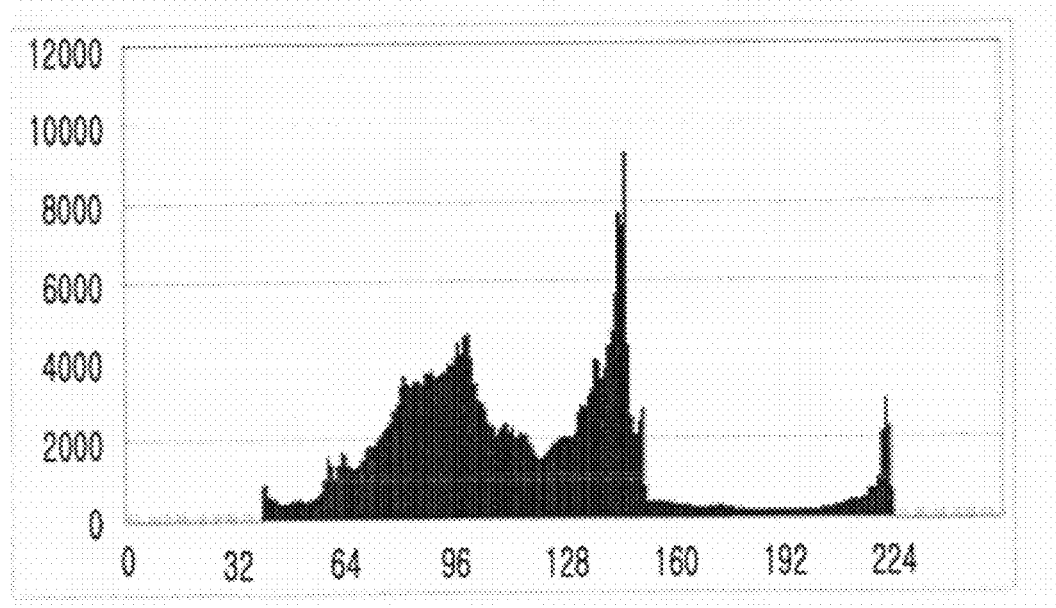
Figure 19B:
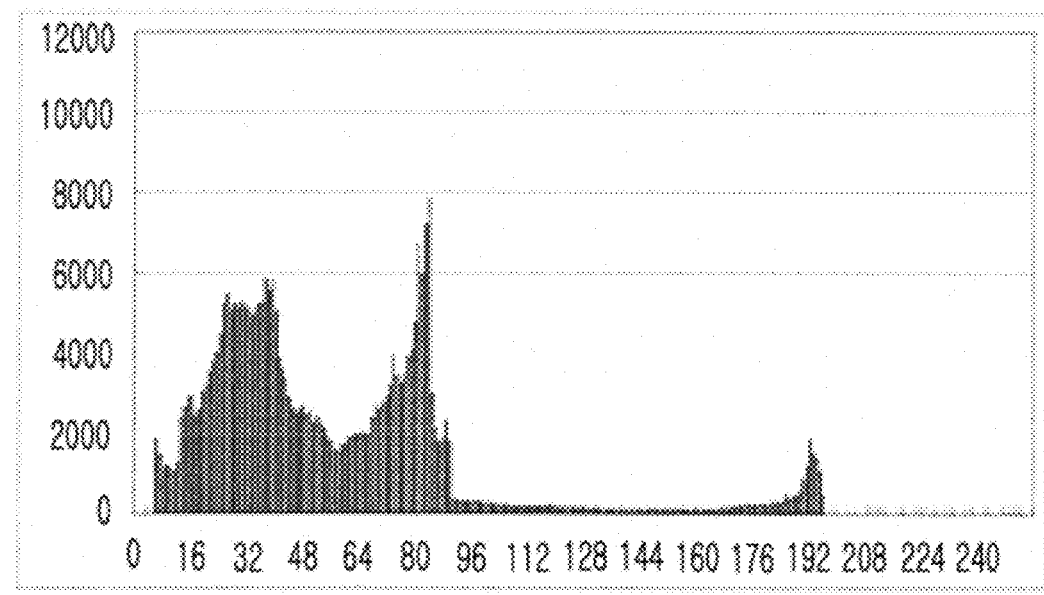
Figure 19C:
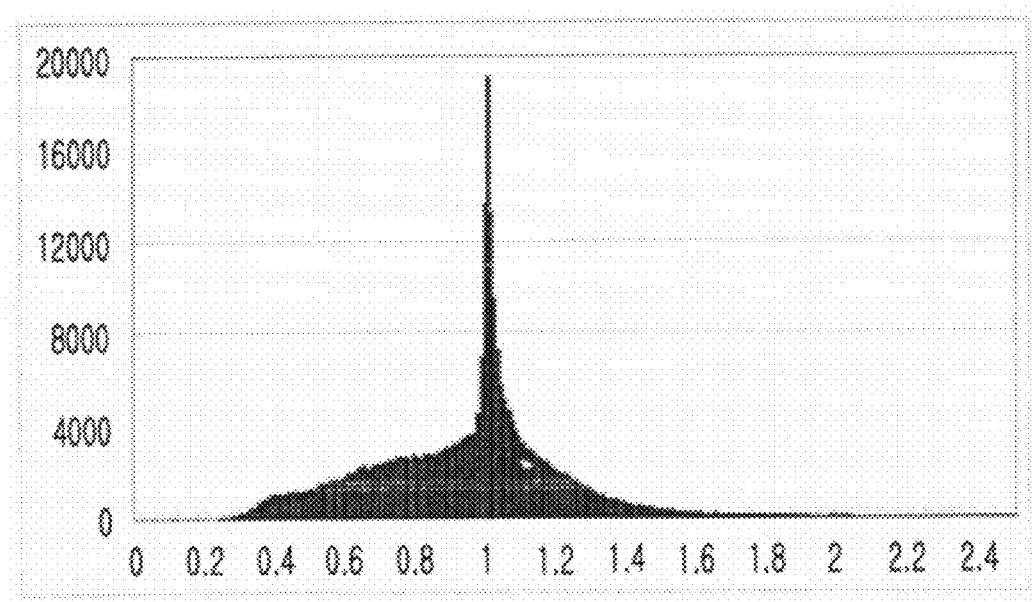

By using the property P1, since the estimated illumination light component L is corrected to be increased even in any luminance range, the distribution of the estimated illumination light component L shown in FIG. 19(b) is, as shown in FIG. 4(b), corrected to the corrected estimated illumination light component L' of a distribution shape in which the estimated illumination light component L is entirely compressed in a high-luminance direction such that the luminance of a low-luminance part is increased.

Figure 4C:
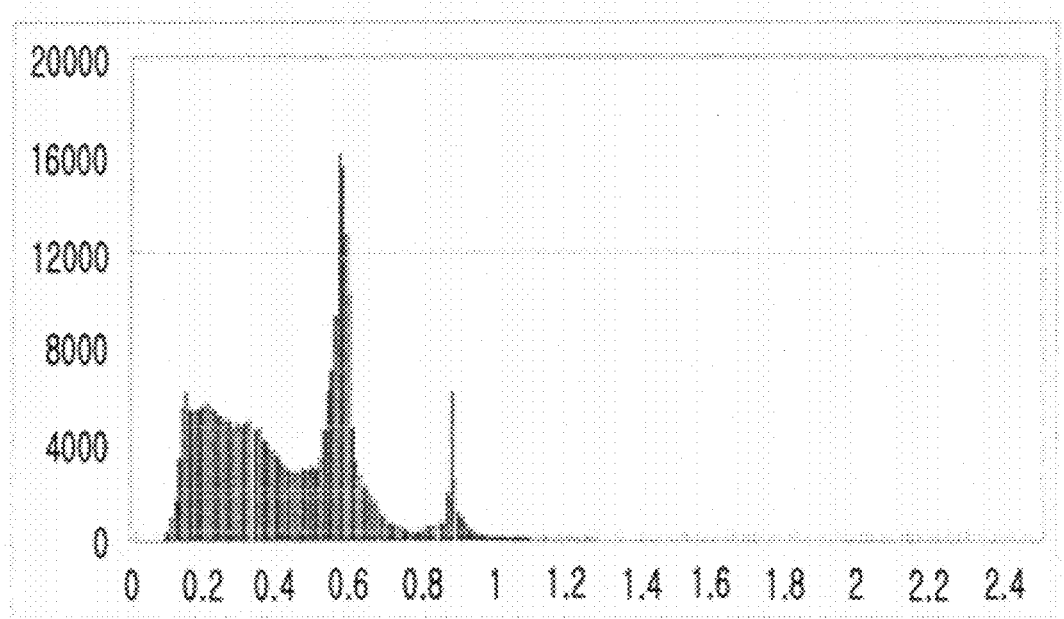

If the Retinex process is performed by using the corrected estimated illumination light component L', it is possible to obtain the corrected luminance signal Y' having a distribution shape shown in FIG. 4(c). The corrected luminance signal Y' is substantially converged in the range equal to or less than 1 while leaving the tendency of the luminance distribution of the original image shown in FIG. 19(a). Thus, a gain value can be uniformly set and thus an optimal gain value for each image need not to be set.

Figure 5A:
FIG. 5 is a diagram illustrating a correction result example of an estimated illumination light component according to the present embodiment.
Figure 5B:
Figure 5C:

FIG. 5(a) shows an example of the original image I and FIG. 5(b) shows an example of the corrected estimated illumination light component L' obtained by performing correction of the present embodiment with respect to the estimated illumination light component L of the original image I. FIG. 5(c) shows an example of the corrected image $I_R$ obtained by performing correction using the corrected estimated illumination light component L'. The histograms shown in FIGS. 4(b) and 4(c) correspond to FIGS. 5(b) and 5(c), respectively. Here, a gain value is set to 255. It can be seen from the example of this figure that a good luminance correction result is obtained without setting an optimal gain value for each image.

Figure 7:
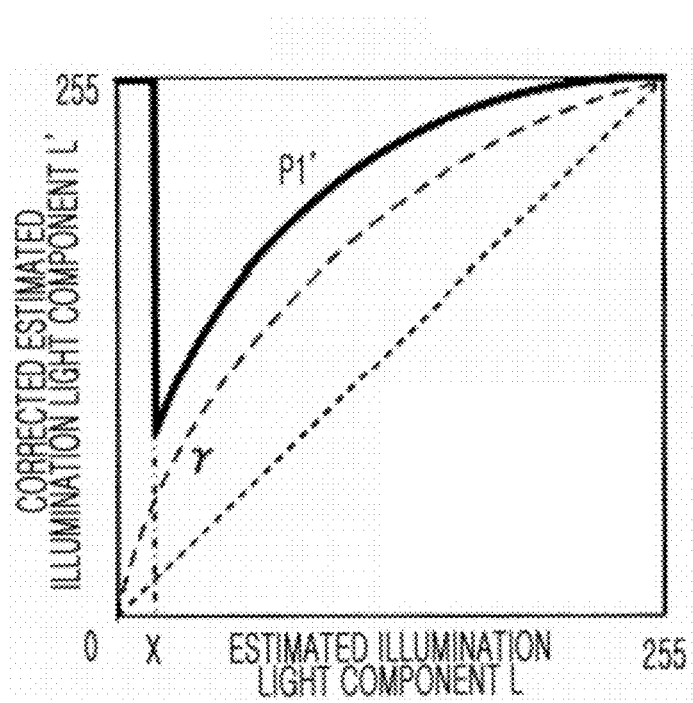
FIG. 7 is a diagram illustrating another example of a characteristic curve.

Although FIG. 4(a) shows a property P1 having continuity between the parts X and X+1, in order to facilitate design of the estimated illumination light component correction unit 130, as denoted by P1' shown in FIG. 7, a combination of a fixed value property of luminance X or less and a gradually increased curve property of luminance X+1 or more may be used.

Figure 8A:
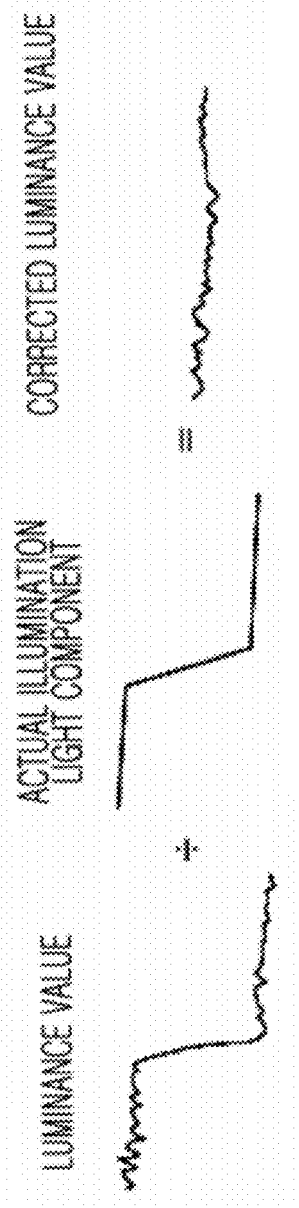
FIG. 8 is a diagram illustrating halo effect.

Finally, a halo suppressing effect by correction of the estimated illumination light component L of the present embodiment will be described. FIG. 8(a) is a diagram schematically showing a relationship among a luminance value of an edge part of an input image, an actual illumination light component and a corrected luminance value after the Retinex process in the case where it is assumed that an actual illumination light component is obtained, in the case where a one-dimensional pixel row including an edge in the center thereof is assumed. Thereafter, the corrected luminance value is multiplied by a gain value to be converted into an output image.

Figure 8B:
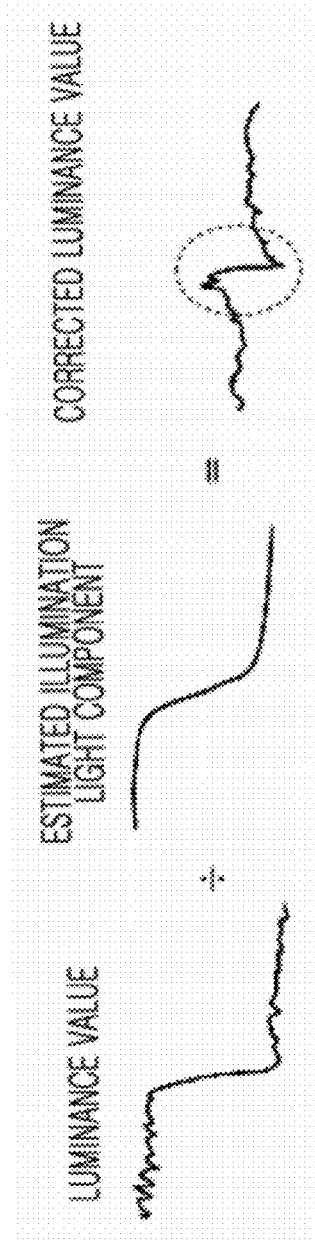

FIG. 8(b) shows the case of performing the Retinex process by using the estimated illumination light component in which correction is not performed with respect to the luminance value of the same input image. Since the estimated illumination light component is obtained by blurring the luminance signal of the input image by filtering, an edge part is not accurately reproduced and smoothed. Accordingly, an edge component is left in the corrected luminance value after the Retinex process. By multiplying the corrected luminance value by a gain value, halo in which a luminance value is increased only in the edge part occurs.

In contrast, FIG. 8(c) shows the case of performing the Retinex process by using the corrected estimated illumination light component obtained by performing correction of the present embodiment with respect to the estimated illumination light component. Since correction is performed such that the amount of correction of a bright part of the estimated illumination light component is small and a dark part excluding a lowest-luminance part is corrected bright to be non-linearly compressed, a corrected luminance value after the Retinex process has a dynamic range of some extent. As a result, protrusion of a luminance value of an edge part is inconspicuous and halo of a bright part is suppressed.

As described above, according to the image processing apparatus 10 of the present invention, since an estimated illumination light component is corrected using a property in which a value from 0 to a reference value is converted into a maximum value and more than the reference value is converted into a value greater than an original value and a slope is decreased as a value is increased and the Retinex process is performed, a gain value and offset value for each image need not be set and low-luminance noise is inconspicuous. Thus, it is possible to obtain a corrected image in which black floating, deterioration in contrast in a low frequency region and halo are suppressed. That is, it is possible to perform good luminance correction without performing a cumbersome process.

Figure 9A:
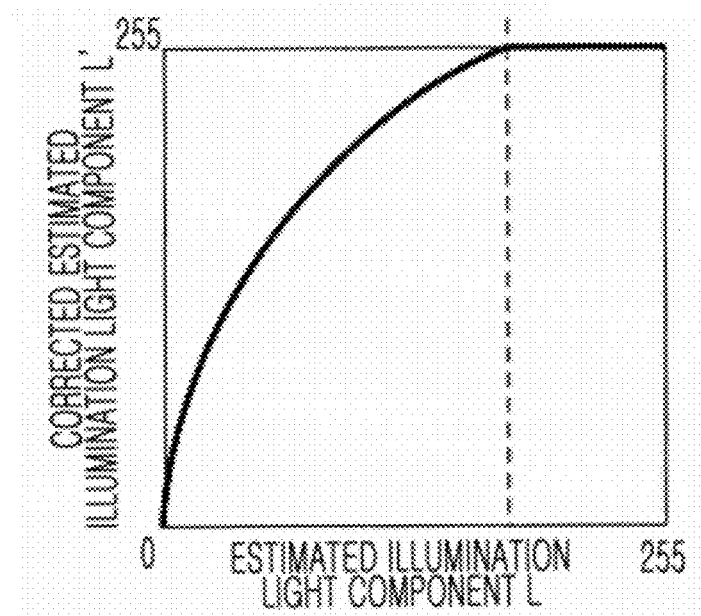
FIG. 9 is a diagram illustrating a clip of a high-luminance part of an estimated illumination light component.

In a second embodiment, as shown in FIG. 9(a), in order to prevent gradation of a high-luminance part from being lost, a high-luminance part of an estimated illumination light component is clipped to a highest luminance value. Then, the Retinex process is not performed with respect to the high-luminance part and thus the gradation of the high-luminance part is maintained.

Figure 9B:
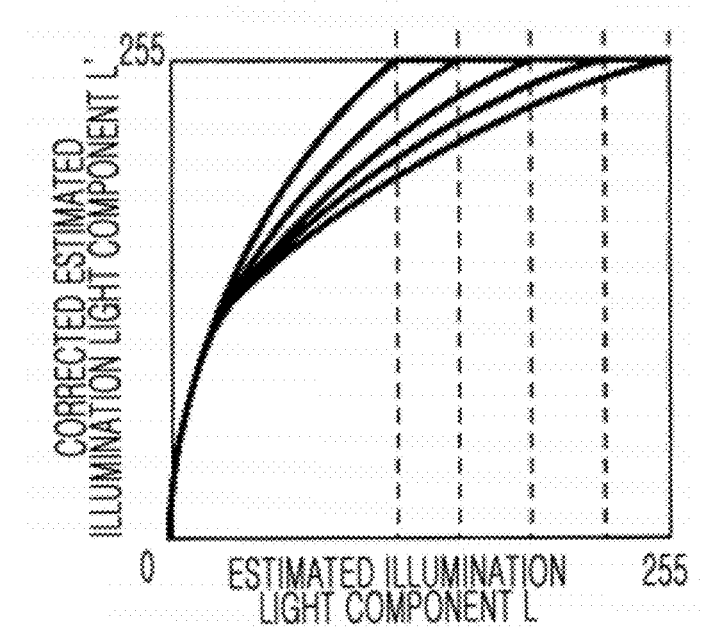

In this case, as shown in FIG. 9(b), an image correction result is changed depending on which luminance value is clipped. However, since a luminance distribution shape or range differs according to images, it is not preferable that a clip luminance value is uniformly set. Here, the "clip luminance value" refers to a section minimum value for clipping to a highest luminance value denoted by dotted lines of FIG. 9. The Retinex effect is not given to a luminance value equal to or greater than the clip luminance value, thereby maintaining gradation.

For example, in case of an image in which gradation of a low-luminance part is entirely emphasized by a high key, the clip luminance value is decreased so as to sufficiently leave the gradation of a high-luminance part, thereby obtaining a good result. In case of an image in which gradation of a low-luminance part is entirely emphasized by a low key, the clip luminance value is increased or clipping is not performed to apply the Retinex effect to a high-luminance part, thereby obtaining a good result.

In the second embodiment, the clip luminance value is quantitatively set by the following method.

Figure 10:
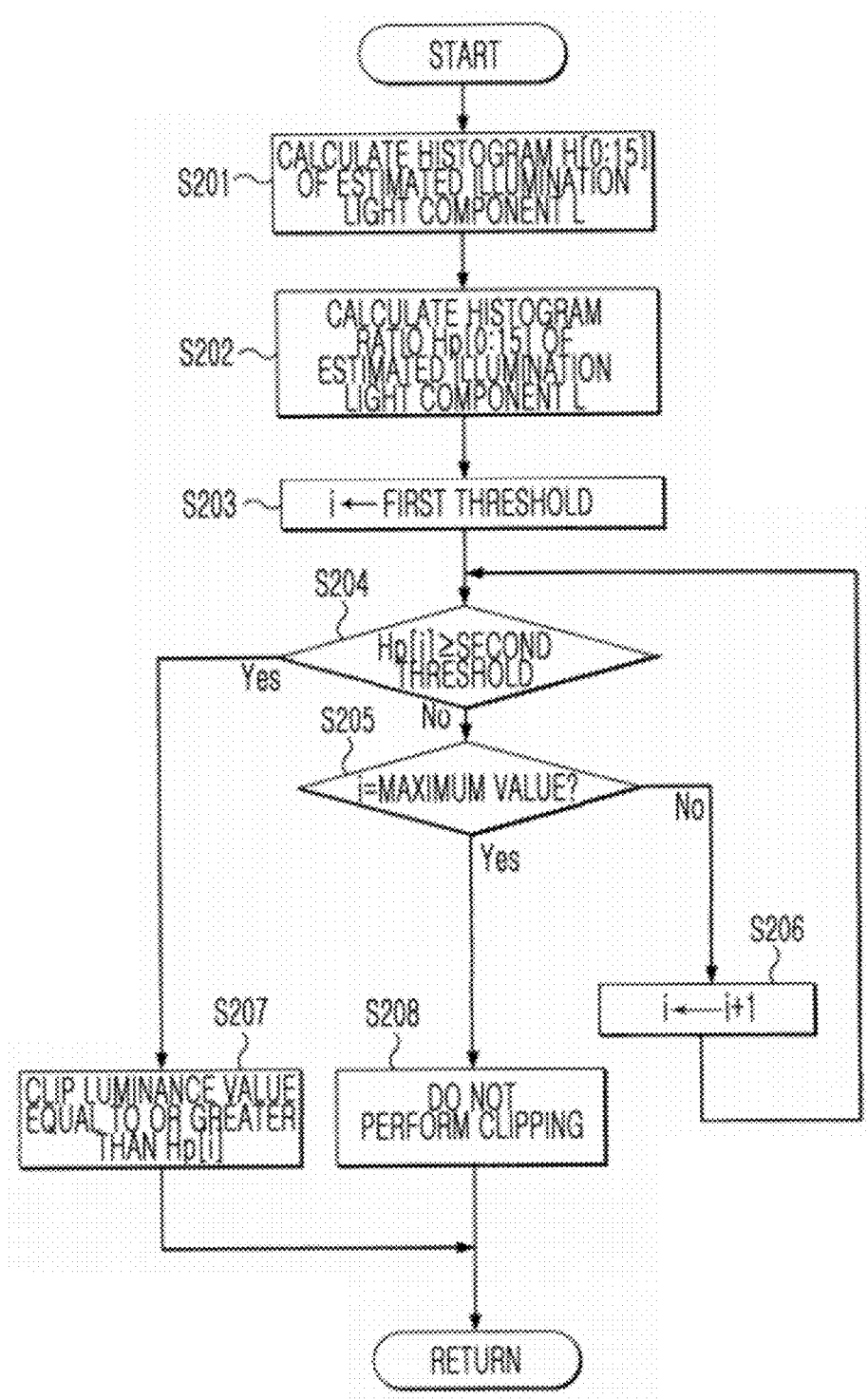
FIG. 10 is a flowchart illustrating a first embodiment of a method of setting a clip luminance value.

First, a first embodiment of a method of setting a clip luminance value will be described with reference to the flowchart of FIG. 10. Hereinafter, a case where the estimated illumination light component L has 8 bits, that is, 256-gradations of 0 to 255 will be described as an example.

In the first embodiment of the method of setting the clip luminance value in correction of the estimated illumination light component L, a histogram H[0:15] of 16 sections is calculated based on the estimated illumination light component L (step S201). For example, a pixel with a luminance value of 0 to 15 in the estimated illumination light component L is included in a section of H[0] and a pixel with a luminance value of 240 to 255 is included in a section of H[15]. The 16 sections are exemplary and another value may be used.

If the histogram H[0:15] is calculated, a histogram ratio Hp[0:15] is calculated based on the number of pixels included in each section of the histogram H[0:15] (step S202). This may be obtained by dividing the number of pixels included in each section by the total number of pixels. Since the histogram ratio Hp[0:15] is used for convenience, the histogram H[0:15] may be used in the following process, instead of the histogram ratio Hp[0:15]. FIG. 11(a) shows an example of the calculated histogram ratio Hp[0:15].

Figure 11:
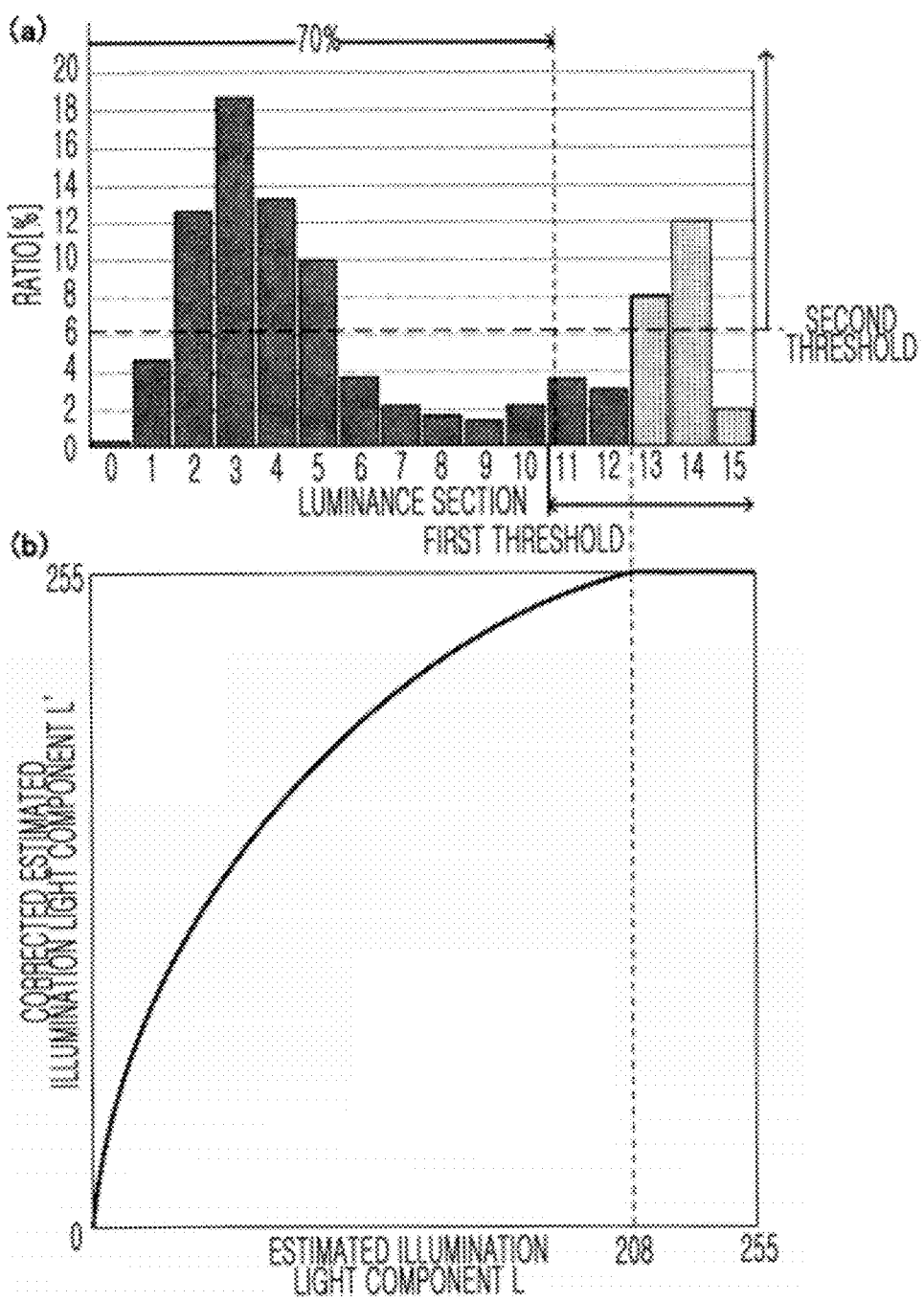
FIG. 11 is a histogram and a correction curve illustrating the first embodiment of the method of setting the clip luminance value.

Next, a first threshold is set with respect to a variable i corresponding to the number of a section (step S203). In the first embodiment, the first threshold is preferably set to a section number corresponding to a value equal to or greater than 70% of a highest luminance value and, in this embodiment, as shown in FIG. 11(a), 11 which is a section including 255×70%≈178 is set as the first threshold. Then, it is determined whether a value of Hp[i] is equal to or greater than a second threshold (step S204). The second threshold may be set to a value of a histogram ratio in the case where the luminance value is uniformly distributed. In the present embodiment, as shown in FIG. 11(a), 16/255≈6.3% is set as the second threshold. For each section, the second threshold may be weighted.

The determination as to whether the value of Hp[i] is equal to or greater than the second threshold in step S204 is sequentially performed from a section of a first threshold to a section of a high-luminance side by increasing the variable i (step S206).

If a section in which the value of Hp[i] is equal to or greater than the second threshold is detected in any variable i (step S204: Yes), a section minimum value of the Hp[i] of the section is set as a clip luminance value and a luminance value equal to or greater than the clip luminance value is clipped (step S207). Since the variable i is increased from the first threshold (step S206), a section of a lowest-luminance side in which the value of Hp[i] is equal to or greater than the second threshold is detected in sections equal to or greater than the first threshold.

In the example of FIG. 11(a), since the value of Hp[13] of a section is equal to or greater than the second threshold, as shown in FIG. 11(b), 208 which is a section minimum value of Hp[13] of the section is set as a clip luminance value. By using the correction curve shown in FIG. 11(b), correction of the estimated illumination light component L is performed. Accordingly, it is possible to maintain the gradation of the high-luminance part even after the Retinex process.

Meanwhile, if a section in which the value of Hp[i] is equal to or greater than the second threshold is not detected up to a section of a highest-luminance side (step S205: Yes), a clip luminance value is not set (step S208) and correction of the estimated illumination light component L is performed without performing clipping. This is because pixels are not sufficiently distributed in the high-luminance side and thus a good correction result can be obtained by emphasizing the gradation of middle- and low-luminance sides in which many pixels are distributed.

As described above, according to the first embodiment, since the clip luminance value is set with very low computational costs, it is possible to quantitatively perform good luminance correction suitable for an individual image. The first and second thresholds are exemplary and other values may be used. "Fine landscape", "backlight portrait", "night scene" and so on may be set as a photographing mode when an image is obtained, and the threshold may be changed according to photographing modes.

Figure 12:
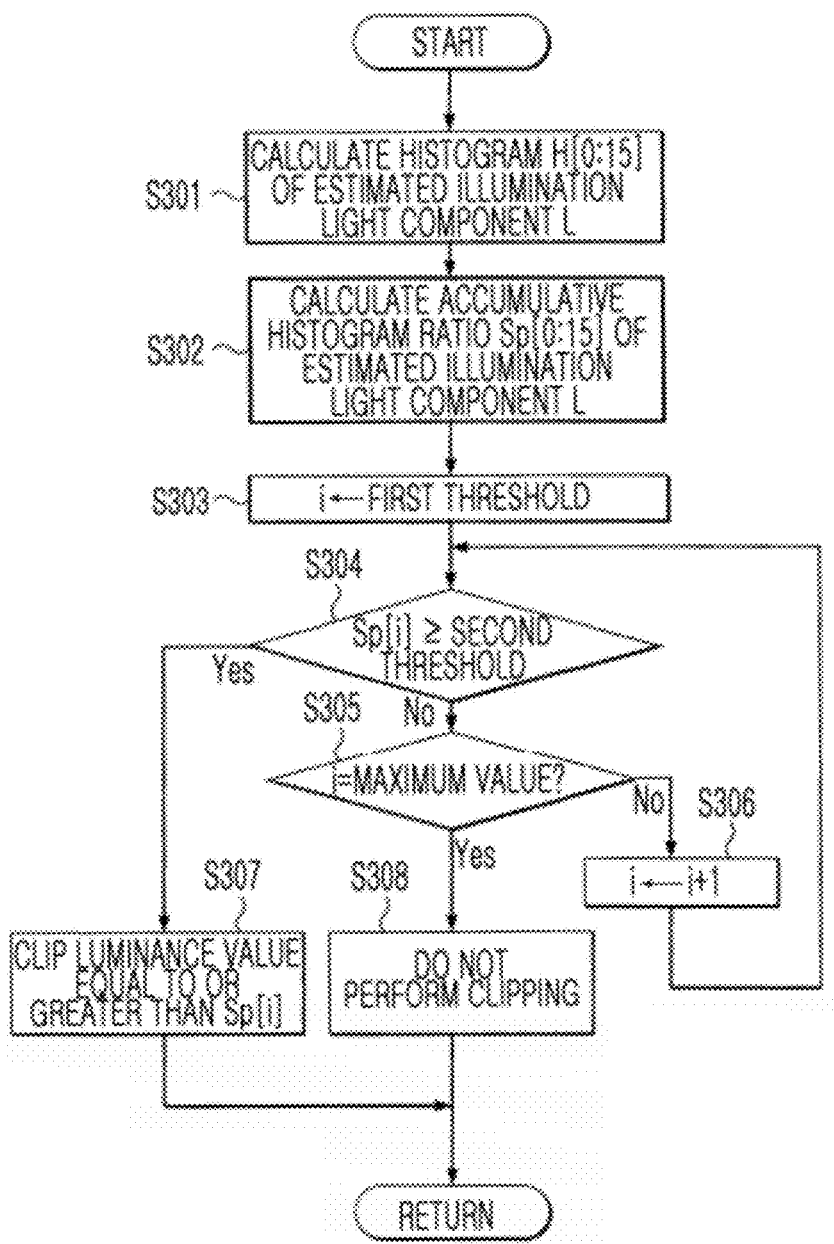
FIG. 12 is a flowchart illustrating a second embodiment of a method of setting a clip luminance value.

Next, a second embodiment of the method of setting the clip luminance value will be described with reference to the flowchart of FIG. 12.

Even in the second embodiment of the method of setting the clip luminance value in correction of the estimated illumination light component L, a histogram H[0:15] of 16 sections is calculated based on the estimated illumination light component L (step S301).

Figure 13:
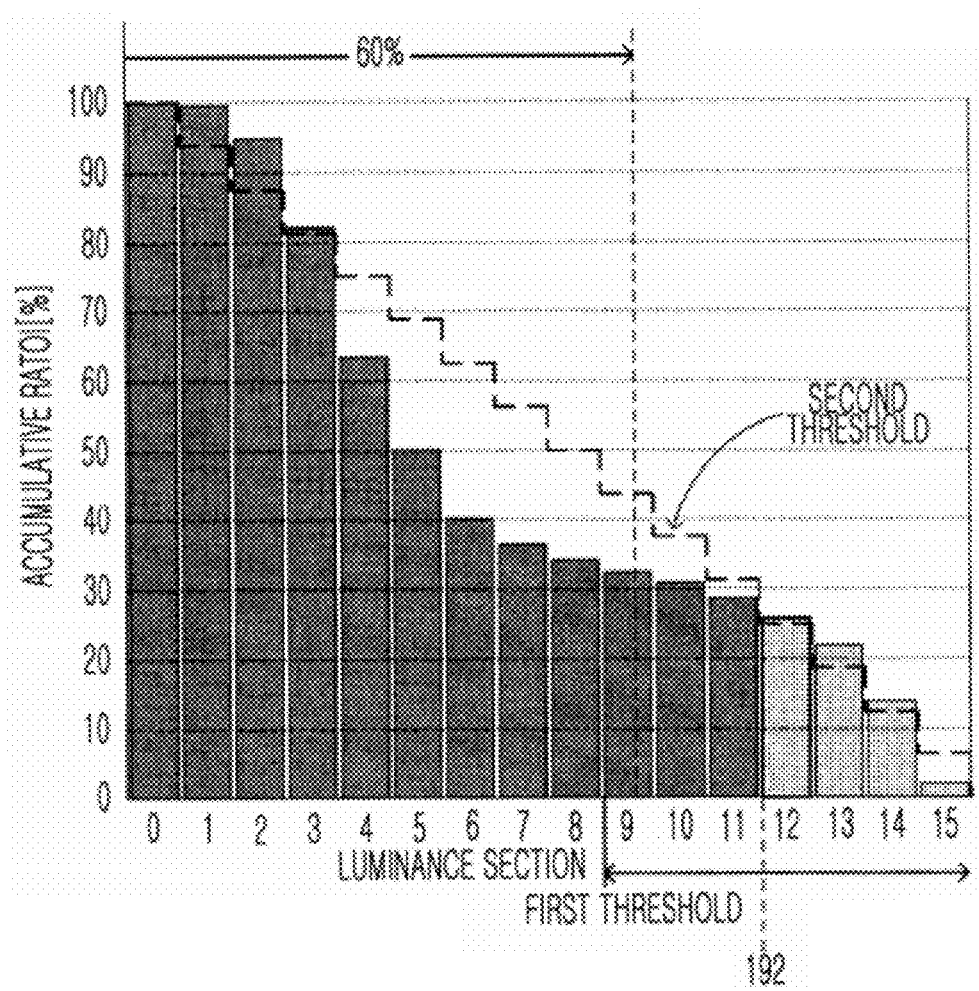
FIG. 13 is an accumulative histogram illustrating the second embodiment of the method of setting the clip luminance value.

If the histogram H[0:15] is calculated, in the second embodiment, an accumulative histogram ratio Sp[0:15] is calculated from a high-luminance side based on the number of pixels included in each section of the histogram H[0:15] (step S302). This may be obtained by accumulating, from the high-luminance side, a ratio calculated by dividing the number of pixels included in each section by the total number of pixels. FIG. 13 shows an example of the calculated accumulative histogram ratio Sp[0:15].

Next, a first threshold is set with respect to a variable i corresponding to the number of a section (step S303). In the second embodiment, the first threshold is preferably set to a section number corresponding to a value equal to or greater than 60% of a highest luminance value and, in this example, as shown in FIG. 13, 9 which is a section including 255×60%≈153 is set as the first threshold.

Then, it is determined whether a value of Sp[i] is equal to or greater than a second threshold (step S304). The second threshold may be set to a value of an accumulative histogram ratio in the case where the luminance value is uniformly distributed. In the present example, as shown in FIG. 13, a value which is increased by about 6.3% from the high-luminance side for each section is set as the second threshold. A value of an accumulative histogram ratio in the case where the luminance value is weighted and distributed may be used as the second threshold.

The determination as to whether the value of Sp[i] is equal to or greater than the second threshold in step S304 is sequentially performed from a section of a first threshold to a section of a high-luminance side by increasing the variable i (step S306).

If a section in which the value of Sp[i] is equal to or greater than the second threshold is detected in any variable i (step S304: Yes), a section minimum value of the Sp[i] of the section is set as a clip luminance value and a luminance value equal to or greater than the clip luminance value is clipped (step S307). Since the variable i is increased from the first threshold (step S306), a section of a lowest-luminance side in which the value of Sp[i] is equal to or greater than the second threshold is detected in sections equal to or greater than the first threshold.

In the example of FIG. 13, since the value of Sp[12] of a section is equal to or greater than the second threshold, 192 which is a section minimum value of Sp[12] of the section is set as a clip luminance value. Then, correction of the estimated illumination light component L is performed. Accordingly, it is possible to maintain the gradation of the high-luminance part.

Meanwhile, if a section in which the value of Sp[i] is equal to or greater than the second threshold is not detected up to a section of a highest-luminance side (step S305: Yes), a clip luminance value is not set (step S308) and correction of the estimated illumination light component L is performed without performing clipping. This is because pixels are not sufficiently distributed in the high-luminance side and thus a good correction result can be obtained by emphasizing the gradation of middle- and low-luminance sides in which many pixels are distributed.

As described above, according to the second embodiment, since the clip luminance value considering density of the high-luminance side is set with very low computational costs, it is possible to quantitatively perform good luminance correction suitable for an individual image. The first and second thresholds are exemplary and other values may be used. "Fine landscape", "backlight portrait", "night scene" and so on may be set as a photographing mode when an image is obtained, and the threshold may be changed according to photographing modes.

Figure 14:
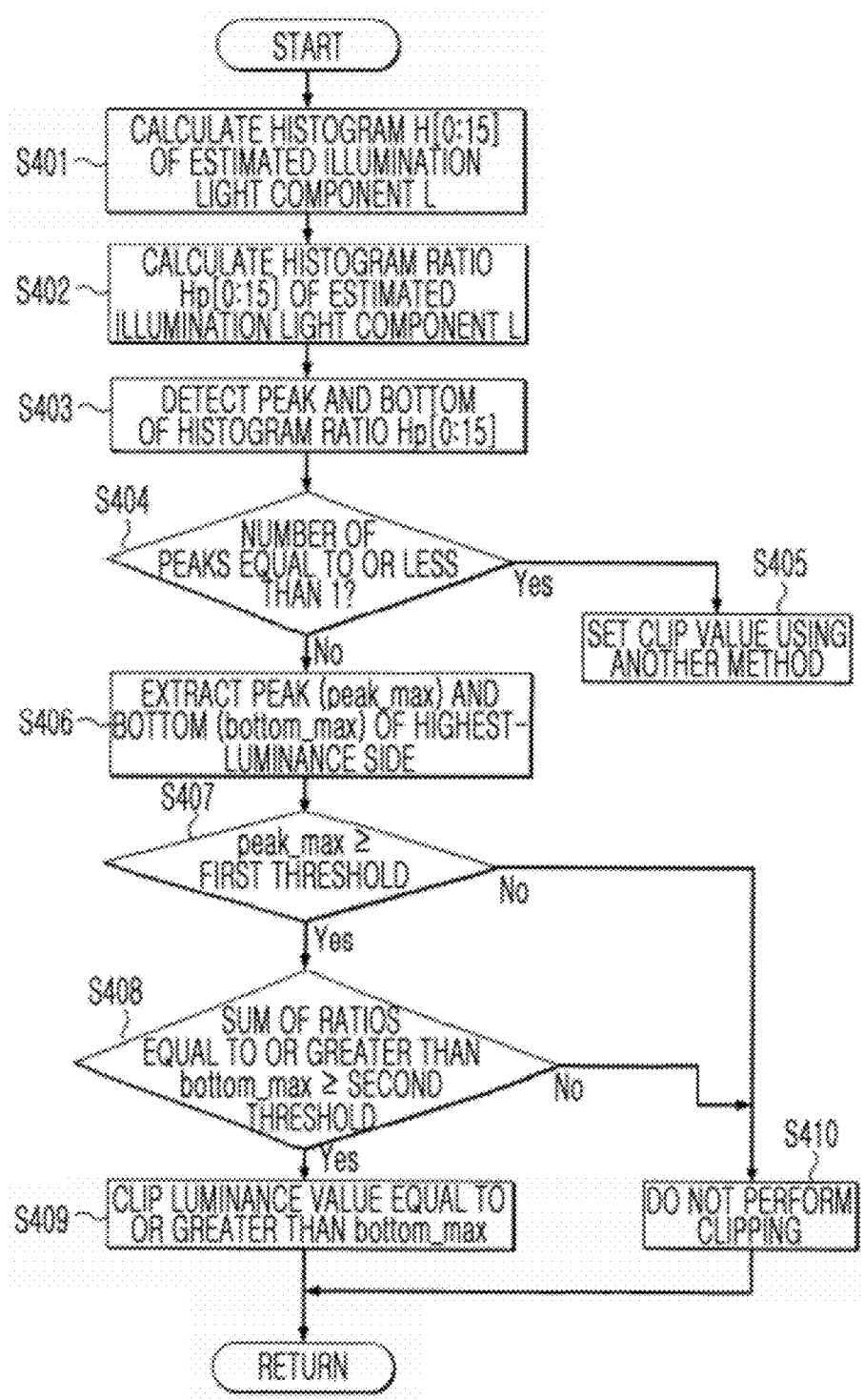
FIG. 14 is a flowchart illustrating a third embodiment of a method of setting a clip luminance value.

Next, a third embodiment of the method of setting the clip luminance value will be described with reference to the flowchart of FIG. 14. In the third embodiment, the clip luminance value is set using a peak and a bottom of a histogram.

Figure 15:
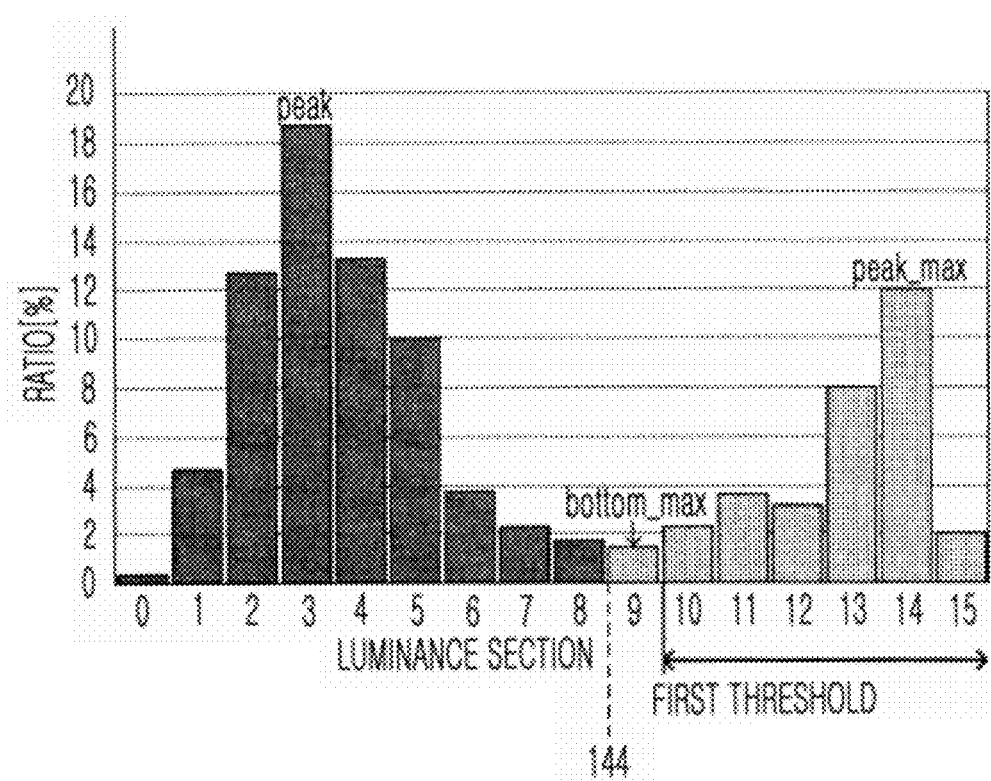
FIG. 15 is a histogram illustrating the third embodiment of the method of setting the clip luminance value.

Even in the third embodiment of the method of setting the clip luminance value in correction of the estimated illumination light component L, similarly to the first embodiment, a histogram H[0:15] of 16 sections is calculated based on the estimated illumination light component L (step S401). A histogram ratio Hp[0:15] is calculated based on the number of pixels included in each section of the histogram H[0:15] (step S402). Instead of the estimated illumination light component L, a luminance histogram of an original image may be used. FIG. 15 shows an example of the calculated histogram H[0:15].

Then, a peak and bottom of the histogram ratio Hp[0:15] are detected (step S403). Detection of the peak and bottom may be performed by using various methods and an example thereof will be described later.

Here, the peak is a section which is a mountain of the histogram, that is, a section having a value greater than those of the adjacent sections of both ends thereof, and the bottom is a section having a smallest value among sections interposed between adjacent peaks. A mountain in which a difference from an adjacent bottom is less than a predetermined reference is excluded from the peak. In addition, a lowest-luminance section and a highest-luminance section adjacent to another section only at one side are regarded as a mountain (peak candidate) if it is greater than one adjacent section.

In example of FIG. 15, a peak is detected at Hp[3] and Hp[14] and Hp[9] which is smallest between Hp[3] and Hp[14] is detected as the bottom. In addition, the value of Hp[11] is greater than those of the sections located at both ends thereof, but is excluded from the peak because a difference from Hp[12] which becomes the bottom in the case where it is set to the peak is small.

If the number of detected peaks is 1 or less (step S404: Yes), the bottom is not formed and thus the setting of the clip luminance value according to the third embodiment is not suitable. Thus, in such a case, the clip luminance value is preferably set according to the above-described first and second embodiments (step S405). In the present invention, a combination of the first, second and third examples may be performed.

If the number of detected peaks is two or more (step S404: No), the peak and bottom of the highest-luminance side are detected (step S406). Hereinafter, the peak of the highest-luminance side is referred to as peak_max and the bottom of the highest-luminance side is referred to bottom_max. In the example of FIG. 15, Hp[14] becomes peak_max and Hp[9] becomes bottom_max.

In the third embodiment, if a section of peak_max is equal to or greater than the first threshold (step S407: Yes) and a sum of histogram ratios Hp of sections equal to or greater than bottom_max is equal to or greater than the second threshold (step S408: Yes), a section minimum value of bottom_max is set to a clip luminance value (step S409). This is because pixels having the luminance value equal to or greater than bottom_max are sufficiently distributed and the gradation of the high-luminance part is important. The first threshold may be, for example, 10 and the second threshold may be, for example 25%.

In the other cases (step S407: No and step S408: No), the clip luminance value is not set and clipping is not performed (step S410). This is because pixels are not sufficiently distributed in the high-luminance side and thus a good correction result can be obtained by emphasizing the gradation of middle- and low-luminance sides in which many pixels are distributed.

In the example of FIG. 15, the section of peak_max is 14, which is equal to or greater than the first threshold of 10 (step S407: Yes) and the sum of ratios of sections equal to or greater than Hp[9] of bottom_max is 33%, which is equal to or greater than the second threshold of 25% (step S408: Yes). Accordingly, 144 which is a section minimum value of Hp[9] of bottom_max is set as a clip luminance value. Then, correction of the estimated illumination light component L is performed. Accordingly, it is possible to maintain the gradation of the high-luminance part.

Figure 16A:
FIG. 16 is an image example illustrating a Retinex processing result when the clip luminance value is set according to the third embodiment.
Figure 16B:
Figure 16C:
Figure 16D:

The Retinex processing result of the case of setting the clip luminance value according to third embodiment will be described with reference to FIG. 16. FIG. 16(a) shows an original image I, FIG. 16(b) shows an estimated illumination light component L obtained by blurring the luminance component of the original image, and FIG. 16(c) shows an image obtained by correcting the estimated illumination light component L using the correction curve shown in FIG. 3(a) in which the clip luminance value is not set and performing the Retinex process. FIG. 16(d) shows an image obtained by correcting the estimated illumination light component L using the correction curve shown in FIG. 9(a) in which the clip luminance value is set according to the third embodiment and performing the Retinex process.

In the image in which the clip luminance value shown in FIG. 16(c) is not set, a dark part of the original image I shown in FIG. 16(a) is corrected bright such that a person is clear, but overcorrection is performed in a bright part such that a boundary between a building and the sky blurs. In contrast, in the image in which the clip luminance value shown in FIG. 16(d) is set, a dark part is corrected bright similarly to the image shown in FIG. 16(c), but correction of a bright part is suppressed such that gradation is maintained and a boundary between a building and the sky is clear.

Next, an example of a procedure (step S403) of detecting the peak and bottom of the histogram ratio Hp[0:15] will be described with reference to the flowchart of FIG. 17. In this procedure, first, sections which are peak candidates are extracted from the sections of the histogram ratio Hp[0:15] (step S501). This process may be performed by extracting a section greater than a previous section and greater than a next section. A section of the lowest-luminance side is set to a peak candidate if it is greater than a next section and a section of the highest-luminance side is set to a peak candidate if it is greater than a previous section.

If the peak candidates are extracted, bottom candidates are extracted based on the extracted peak (step S502). This process may be performed by setting a section having a smallest ratio value among sections interposed between adjacent peak candidates as a bottom candidate.

Next, a peak is selected from among the peak candidates (step S503). Selection of the peak is a process of excluding peak candidates in which a difference in the histogram ratio from the adjacent bottom candidate is equal to or less than a third threshold and setting the remaining peak candidates as the peak. The third threshold may be, for example, 2%.

Finally, the bottom is set based on the section set as the peak (step S504). This process may be performed by setting a section having a smallest value among sections interposed between adjacent peaks as the bottom.

The third embodiment of setting the clip luminance value based on the peak and bottom of the histogram ratio was described above. In the third embodiment, computational costs are increased as compared to the first and second embodiments, but, instead, a correction result considering the luminance distribution of an individual image can be obtained. As described above, the clip luminance value may be set using a combination of the first, second and third embodiments.

Figure 18:
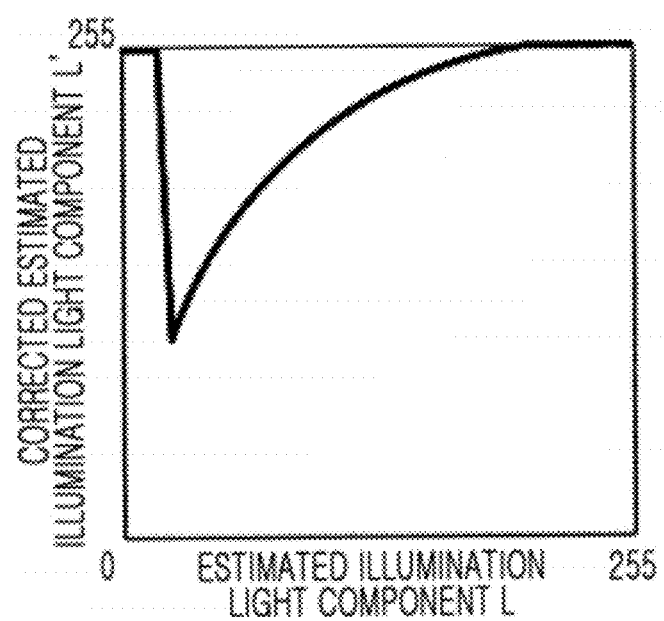
FIG. 18 is a diagram showing an example of a correction curve clipped to a maximum luminance value even with respect to a low-luminance part.

Although the clip luminance value of the high-luminance part is described in the above-described embodiments, correction of the estimated illumination light component L may be performed using a correction curve in which luminance value of very-low-luminance part, as shown in FIG. 18, is clipped to a maximum luminance value. Accordingly, since the gradation of the very-low-luminance part is maintained in addition to the maintenance of the gradation of the high-luminance part, it is possible to prevent dark-part noise from being emphasized or black floating from occurring. In this case, if the full scale of the estimated illumination light L is set to 255, it is possible to obtain a good result, for example, by clipping a value from 0 to 2~4 to a maximum luminance value.

According to the present invention, it is possible to provide an image processing apparatus and an image processing method capable of performing good luminance correction without performing a cumbersome process. According to the present invention, it is possible to provide an image processing apparatus and an image processing method capable of quantitatively performing good luminance correction suitable for an individual image and, more particularly, performing good luminance correction without losing gradation of a high-luminance part.

While this invention has been particularly shown and described with reference to exemplary embodiments thereof, the present invention is not limited thereto and it will be understood by those skilled in the art that various changes in form and details may be made therein without departing from the spirit and scope of the invention as defined by the appended claims.

What is claimed is:

1. An image processing apparatus comprising:
   an illumination light component estimation unit which calculates an estimated illumination light component of an original image;
   an estimated illumination light component correction unit which outputs a corrected estimated illumination light component obtained by correcting the estimated illumination light component;
   a Retinex processing unit which corrects a luminance component of the original image by dividing the luminance component by the corrected estimated illumination light component, and
   a gain adjustment unit which adjusts gain of the corrected luminance component,
   wherein the estimated illumination light component correction unit converts an estimated illumination light component having a value from 0 to a reference value into a maximum value of the corrected estimated illumination light component, converts an estimated illumination light component having a value greater than the reference value such that the value of the corrected estimated illumination light component becomes greater than the value of the estimated illumination light component, and uses a property in which an increasing ratio of the corrected estimated illumination light component is decreased as the value of the estimated illumination light component is increased.

2. The image processing apparatus of claim 1, wherein the gain adjustment unit performs gain adjustment by multiplying the corrected luminance component by a uniform gain value regardless of content of the original image.

3. The image processing apparatus of claim 1, wherein the estimated illumination light component correction unit converts the estimated illumination light component having the value greater than the reference value into the corrected estimated illumination light component having a value greater than a property represented by 0.3 power of the value of the estimated illumination light component.

4. An image processing apparatus comprising:
   an illumination light component estimation unit which calculates an estimated illumination light component of an original image;
   an estimated illumination light component correction unit which outputs a corrected estimated illumination light component obtained by correcting the estimated illumination light component; and
   a Retinex processing unit which corrects a luminance component of the original image by dividing the luminance component by the corrected estimated illumination light component,
   wherein the estimated illumination light component correction unit divides a value from a lowest-luminance side to a highest-luminance side of the estimated illumination light component, into a plurality of sections, and
   the estimated illumination light component correction unit obtains a lowest-luminance side section having a frequency value equal to or greater than a second threshold in sections equal to or greater than a first threshold of a frequency distribution, in which a value from a lowest-luminance side to a highest-luminance side of the estimated illumination light component is divided into a plurality of sections, and corrects the estimated illumination light component value equal to or greater than a minimum luminance value of the obtained section, to a maximum value of the corrected estimated illumination light component.

5. The image processing apparatus of claim 4, wherein the second threshold is a frequency value obtained by a corresponding section in case of a uniform luminance distribution.

6. An image processing apparatus comprising:
   an illumination light component estimation unit which calculates an estimated illumination light component of an original image;
   an estimated illumination light component correction unit which outputs a corrected estimated illumination light component obtained by correcting the estimated illumination light component; and a Retinex processing unit which corrects a luminance component of the original image by dividing the luminance component by the corrected estimated illumination light component, wherein the estimated illumination light component correction unit divides a value from a lowest-luminance side to a highest-luminance side of the estimated illumination light component, into a plurality of sections, and the estimated illumination light component correction unit obtains a lowest-luminance side section having a frequency value equal to or greater than a second threshold in sections equal to or greater than a first threshold of an accumulative frequency distribution from a high-luminance side, in which a value from a lowest-luminance side to a highest-luminance side of the estimated illumination light component is divided into a plurality of sections, and corrects the estimated illumination light component value equal to or greater than a minimum luminance value of the obtained section to a maximum value of the corrected estimated illumination light component.

7. An image processing apparatus comprising:

an illumination light component estimation unit which calculates an estimated illumination light component of an original image;

an estimated illumination light component correction unit which outputs a corrected estimated illumination light component obtained by correcting the estimated illumination light component; and a Retinex processing unit which corrects a luminance component of the original image by dividing the luminance component by the corrected estimated illumination light component, wherein the estimated illumination light component correction unit divides a value from a lowest-luminance side to a highest-luminance side of the estimated illumination light component, into a plurality of sections, and the estimated illumination light component correction unit extracts a peak section of a highest-luminance side and a bottom section of the highest-luminance side in the frequency distribution, in which a value from a lowest-luminance side to a highest-luminance side of the estimated illumination light component is divided into a plurality of sections, and corrects the estimated illumination light component value equal to or greater than a minimum luminance value of the bottom section to a maximum value of the corrected estimated illumination light component if the frequency value of the extracted peak section is equal to or greater than a first threshold and a sum of frequency values from the highest-luminance section to the extracted bottom section is equal to or greater than a second threshold.

8. An image processing method comprising:

an illumination light component estimation step of calculating an estimated illumination light component of an original image;

an estimated illumination light component correction step of outputting a corrected estimated illumination light component obtained by correcting the estimated illumination light component;

a Retinex processing step of correcting a luminance component of the original image by dividing the luminance component by the corrected estimated illumination light component, and a gain adjustment step of adjusting gain of the corrected luminance component, wherein the estimated illumination light component correction step converts an estimated illumination light component having a value from 0 to a reference value into a maximum value of the corrected estimated illumination light component, converts an estimated illumination light component having a value greater than the reference value such that the value of the corrected estimated illumination light component becomes greater than the value of the estimated illumination light component, and uses a property in which an increasing ratio of the corrected estimated illumination light component is decreased as the value of the estimated illumination light component is increased.

9. An image processing method comprising:

an illumination light component estimation step of calculating an estimated illumination light component of an original image;

an estimated illumination light component correction step of outputting a corrected estimated illumination light component obtained by correcting the estimated illumination light component; and a Retinex processing step of correcting a luminance component of the original image by dividing the luminance component by the corrected estimated illumination light component, wherein the estimated illumination light component correction step divides a value from a lowest-luminance side to a highest-luminance side of the estimated illumination light component into a plurality of sections, and the estimated illumination light component correction step obtains a lowest-luminance side section having a frequency value equal to or greater than a second threshold in sections equal to or greater than a first threshold of a frequency distribution, in which a value from a lowest-luminance side to a highest-luminance side of the estimated illumination light component is divided into a plurality of sections, and corrects the estimated illumination light component value equal to or greater than a minimum luminance value of the obtained section to a maximum value of the corrected estimated illumination light component.

10. An image processing method comprising:

an illumination light component estimation step of calculating an estimated illumination light component of an original image;

an estimated illumination light component correction step of outputting a corrected estimated illumination light component obtained by correcting the estimated illumination light component; and a Retinex processing step of correcting a luminance component of the original image by dividing the luminance component by the corrected estimated illumination light component, wherein the estimated illumination light component correction step divides a value from a lowest-luminance side to a highest-luminance side of the estimated illumination light component into a plurality of sections, and the estimated illumination light component correction step obtains a lowest-luminance side section having a frequency value equal to or greater than a second threshold in sections equal to or greater than a first threshold of an accumulative frequency distribution from a high-luminance side, in which a value from a lowest-luminance side to a highest-luminance side of the estimated illumination light component is divided into a plurality of sections, and corrects the estimated illumination light component value equal to or greater than a minimum luminance value of the obtained section, to a maximum value of the corrected estimated illumination light component.

11. An image processing method comprising:
an illumination light component estimation step of calculating an estimated illumination light component of an original image;
an estimated illumination light component correction step of outputting a corrected estimated illumination light component obtained by correcting the estimated illumination light component; and
a Retinex processing step of correcting a luminance component of the original image by dividing the luminance component by the corrected estimated illumination light component,
wherein the estimated illumination light component correction step divides a value from a lowest-luminance side to a highest-luminance side of the estimated illumination light component into a plurality of sections, and
the estimated illumination light component correction step extracts a peak section of a highest-luminance side and a bottom section of the highest-luminance side in the frequency distribution, in which a value from a lowest-luminance side to a highest-luminance side of the estimated illumination light component is divided into a plurality of sections, and corrects the estimated illumination light component value equal to or greater than a minimum luminance value of the bottom section to a maximum value of the corrected estimated illumination light component if the frequency value of the extracted peak section is equal to or greater than a first threshold and a sum of frequency values from the highest-luminance section to the extracted bottom section is equal to or greater than a second threshold.

* * * * *